United States Patent
Barrass et al.

(10) Patent No.: US 9,654,032 B2
(45) Date of Patent: May 16, 2017

(54) ELECTRIC MOTOR AND MOTOR CONTROLLER

(75) Inventors: Peter Barrass, Gateshead (GB); Gary Squire, Gateshead (GB); Robert Taylor, Gateshead (GB); Howard Slater, Gateshead (GB); David Hodgson, Gateshead (GB); Philip Eagleton, Gateshead (GB)

(73) Assignee: Sevcon Limited (GB)

( * ) Notice: Subject to any disclaimer, the term of this patent is extended or adjusted under 35 U.S.C. 154(b) by 311 days.

(21) Appl. No.: 14/114,321

(22) PCT Filed: Apr. 30, 2012

(86) PCT No.: PCT/GB2012/050952
§ 371 (c)(1),
(2), (4) Date: Oct. 28, 2013

(87) PCT Pub. No.: WO2012/146945
PCT Pub. Date: Nov. 1, 2012

(65) Prior Publication Data
US 2014/0055077 A1  Feb. 27, 2014

(30) Foreign Application Priority Data

Apr. 28, 2011  (GB) .................................. 1107185.9
Apr. 28, 2011  (GB) .................................. 1107192.5
(Continued)

(51) Int. Cl.
*H02P 25/00*  (2006.01)
*H02P 6/00*   (2016.01)
(Continued)

(52) U.S. Cl.
CPC .......... *H02P 6/001* (2013.01); *B60L 11/1803* (2013.01); *H02P 6/34* (2016.02);
(Continued)

(58) Field of Classification Search
CPC .................................. H02P 6/001; H02P 6/00
(Continued)

(56) References Cited

U.S. PATENT DOCUMENTS 4,181,875 A   1/1980  Kohzai et al.
4,528,487 A   7/1985  Jimbo et al.
(Continued)

FOREIGN PATENT DOCUMENTS

DE   10044546 A1   4/2002
EP    0446994 A2   9/1991
(Continued)

OTHER PUBLICATIONS

International Search Report for PCT/GB2012/050952 mailed Oct. 24, 2013.
(Continued)

*Primary Examiner* — Eduardo Colon Santana
*Assistant Examiner* — Gabriel Agared
(74) *Attorney, Agent, or Firm* — Lerner, David, Littenberg, Krumholz & Mentlik, LLP

(57) ABSTRACT

An electric motor controller having a front face and a rear face, the front face carrying a plurality of AC output couplings and the controller carrying a converter configured to convert a received DC supply into an output AC supply for controlling an electric motor, the AC output couplings being disposed symmetrically about an axis of symmetry of the controller on the front face of the controller. Also described is an apparatus comprising: a DC series motor; and a first current supply configured to supply a first current to an armature of the DC series motor; a second current supply configured to supply a second current to a field winding of the DC series motor; and a controller configured to control the first current supply to supply the first current based on a required torque output for the motor, and to
(Continued)

control the second current supply to supply the second current based on the first current.

18 Claims, 13 Drawing Sheets

(30) Foreign Application Priority Data

Apr. 28, 2011 (GB) .................................. 1107207.1
Sep. 27, 2011 (GB) .................................. 1116622.0

(51) Int. Cl.
  *B60L 11/18* (2006.01)
  *H02P 7/298* (2016.01)
  *H02P 6/34* (2016.01)
  *H02P 7/03* (2016.01)

(52) U.S. Cl.
  CPC ............. *H02P 7/04* (2016.02); *H02P 7/298* (2013.01); *Y02T 10/642* (2013.01); *Y02T 10/7005* (2013.01); *Y02T 10/7258* (2013.01)

(58) Field of Classification Search
  USPC ....................................................... 318/700
  See application file for complete search history.

(56) References Cited

U.S. PATENT DOCUMENTS

| | | |
|---|---|---|
| 4,639,647 A | 1/1987 | Posma |
| 5,304,912 A | 4/1994 | Kajiwara et al. |
| 5,349,278 A | 9/1994 | Wedeen |
| 5,689,170 A | 11/1997 | Ishikawa |
| 5,821,720 A | 10/1998 | Deng et al. |
| 5,994,859 A | 11/1999 | Deng et al. |
| 2002/0149332 A1 | 10/2002 | Inagaki et al. |
| 2003/0057916 A1 | 3/2003 | Davis et al. |
| 2003/0177846 A1* | 9/2003 | Tamagawa ............... G01L 3/02 73/862.29 |
| 2004/0021437 A1* | 2/2004 | Maslov ..................... B60L 8/00 318/400.01 |
| 2006/0049315 A1* | 3/2006 | Patel ....................... B64G 1/283 244/169 |
| 2007/0070667 A1 | 3/2007 | Stancu et al. |
| 2009/0032320 A1 | 2/2009 | Ward et al. |
| 2009/0125173 A1* | 5/2009 | Komatsu ................. B60K 6/445 701/22 |
| 2010/0152940 A1* | 6/2010 | Mitsutani ................ B60K 6/445 701/22 |
| 2010/0207559 A1 | 8/2010 | Imai |
| 2010/0232106 A1 | 9/2010 | Kauranen et al. |
| 2010/0327680 A1 | 12/2010 | Miyachi et al. |
| 2011/0031914 A1* | 2/2011 | Green ....................... H02P 6/20 318/400.11 |
| 2013/0249447 A1* | 9/2013 | Ishii ....................... H02P 23/0004 318/400.01 |

FOREIGN PATENT DOCUMENTS

| | | |
|---|---|---|
| EP | 0469617 A1 | 2/1992 |
| EP | 0658970 A1 | 6/1995 |
| EP | 0953471 A2 | 11/1999 |
| EP | 1002699 A2 | 5/2000 |
| EP | 1143314 A1 | 10/2001 |
| EP | 1953030 A1 | 8/2008 |
| EP | 2229044 A2 | 9/2010 |
| FR | 2371087 A1 | 6/1978 |
| GB | 1315851 A | 5/1973 |
| GB | 1574509 A | 9/1980 |
| JP | H03142992 A | 6/1991 |
| JP | H0787789 A | 3/1995 |
| JP | 8256497 A | 10/1996 |
| JP | H09130902 A | 5/1997 |
| JP | 9219970 A | 8/1997 |
| JP | H09219970 A | 8/1997 |
| JP | 2000125410 A | 4/2000 |
| JP | 2003037902 A | 2/2003 |
| JP | 2007215299 A | 8/2007 |
| JP | 2007331646 A | 12/2007 |
| JP | 2008040936 A | 2/2008 |
| JP | 2011041430 A | 2/2011 |
| WO | 9319949 A1 | 10/1993 |
| WO | 2007086263 A1 | 8/2007 |

OTHER PUBLICATIONS

Written Opinion of the International Search Authority for PCT/GB2012/050952 mailed Oct. 24, 2013.

* cited by examiner

ELECTRIC MOTOR AND MOTOR CONTROLLER

The present invention relates to a controller for an electric motor and to a modular motor-controller assembly. Such controllers and motors maybe used in electric vehicles.

Some aspects of the invention relate to electric vehicles and to controllers and control schemes for electric motors in electric vehicles. In particular some aspects relate to a motor controller with an oscillation damping system.

Some aspects of the present invention also relate to control of DC series motors, and control circuitry for controlling DC motors, these aspects of the invention have particular, but not exclusive relevance to the control of DC series motors.

AC Electric Motors and Motor Controllers

In electric vehicles, to avoid the weight and cost of a differential individual (separate) motors may be used to drive individual wheels. The environmental problems associated with carbon dioxide vehicle emissions are well known. A proposed solution is replacement of the internal combustion engine with the electric motor for vehicles. Each electric motor requires a controller. In the case where the motor is a three-phase motor, the controller has an inverter for converting the DC supply to AC for the motor. This process generates heat from the rapid switching and on the state voltage drop of high power transistors. Heat is also generated in the motor due to ohmic (I²R) heating in the windings, eddy currents and due to friction. Each motor and each controller requires a cooling system. Typically, cooling is achieved by running fluid coolant past a heat sink or manifold to absorb thermal energy. Although a single pump may be used, each cooling system will comprise a system of pipes to enable fluid circulation. Thus in an arrangement having two motors and two motor-controllers, four sets of cooling apparatus (including heat sinks manifolds and pipework) must be provided. The presence of a plurality of motors, controllers, associated electrical components and cooling components means that the design and assembly of electric vehicle traction systems is a non trivial task.

A further problem is that the high current required for the motors (of the order of hundreds of Amps), leads to losses when spaced-apart motors and controllers are connected by long wires. Such wiring also presents safety issues, such as a risk of electrocution to emergency services personnel needing to cut in to a crashed vehicle.

The inventors in the present case have recognised a need to reduce the weight, bulk and complexity of electric traction motors and motor-controller assemblies, and to improve safety.

DC Series Motors and the Control Thereof.

Various types of DC electric motors are known, and each having associated advantages and disadvantages. One type of DC motor is a DC series motor, which is illustrated schematically in FIG. 5. In a DC series motor the armature winding 1004 and the field winding 6 of the motor 1002 are connected in series such that the same current passes through each winding. Compared with other motor types, this means that the field winding carries much higher currents than usual, and must be made of heavy duty wire.

As the amount of current passing through the windings, and in particular the field winding, determines the torque that can be developed by the motor, DC series motors generally provide high starting torques, making them able to move relatively high shaft loads when first energized. One common use of a DC series motor that relies on this high torque characteristic is as a starter motor to start an internal combustion engine. The high torque characteristics of series motors have also led to consideration of these motors in traction applications such as in electrically powered vehicles.

One characteristic of DC series motors is that reversing the direction of current through the motor does not change the direction of rotation of the motor. This is because reversing the direction of current through the motor, reverses the current in both the field winding and the armature winding, resulting in reversal of both magnetic fields. This characteristic of DC series motors has led to these motors being considered 'universal' motors as it allows them to be powered using either DC or AC current.

In order to reverse the direction of rotation of a series motor, it is necessary to reverse the current flow through one of the field winding or the armature winding, but not both. Thus, in order to allow reversing of the motor, DC series motors supplied for traction uses commonly provide more than two terminals at which a voltage can be applied to the motor. For example, many commercially available DC series motors are provided with four terminals associated with the terminals S1, S2, A1 and A2 shown in FIG. 5. Other designs of series motor allow control for reversing the motor using three terminals.

A circuit for motor reversal (for example as shown in FIG. 6) is commonly employed to control the direction of current in one of either the field or armature windings, and therefore allow the motor to be operated in either direction. The circuit for motor reversal is coupled to the four terminals A1, A2, S1 and S2 provided for the DC series motor. In order to manage the high current flows in the motor, a circuit for motor reversal may use mechanical switches to direct the current through one of the windings depending on the required direction of rotation. In the example circuit of FIG. 2, switches 1008a and 1008b may be operated (i.e. closed) together to direct the current through the armature winding 1004 in a first direction, while operating switches 1010a and 1010b together will reverse the direction of current through the armature, thereby reversing the direction of rotation of the motor. However, these mechanical switches can be unreliable and increase the cost of manufacturing and servicing the motor/motor controller assembly.

Another known type of DC motor, is the separately excited motor or SEM. In a SEM, the current flowing through the field winding and the armature winding of the motor can be controlled (excited) separately. In contrast to the DC series motor, the field winding of an SEM is not expected to carry the same current as the armature, and therefore the field winding and associated control circuitry will be rated for much lower currents. The ability to control the field and armature currents independently allows an SEM to be more flexible, and allows more advanced control of the torque and speed characteristics of the motor to be achieved. However, the circuits required to individually control the field and armature currents are often expensive.

Some aspects and examples of the invention address at least part of the above described technical problem.

Dual Controller Cross Check

Another technical problem addressed by embodiments of the disclosure is the problem of safety control and monitoring in electric vehicles having more than one drive motor and controller.

The use of electric motors enables vehicle designers to simplify the drive line of a vehicle, for example each driven wheel in a vehicle may be driven directly by an electric motor dedicated only to that wheel. In addition to simplified construction, it is recognised that such independent control of the wheels of a vehicle can provide certain other advantages. In particular, the manoeuvrability of the vehicle may be substantially greater than in vehicles lacking such independent control of driven wheels.

It is generally preferred to provide independent power supply inverters for each motor in a vehicle and the inventors in the present case have appreciated that, whilst it provides many advantages the independent control of different wheels of a vehicle also presents certain challenges. For example, if the power supply inverter associated with some (but not all) of the wheels malfunctions whilst a vehicle is in motion the vehicle may be caused to swerve or even to spin. Aspects and examples of the disclosure aim to address at least a part of this problem.

Motor Controller with Oscillation Damping System

The need to reduce carbon emissions associated with all forms of industry is well known. To answer this need electric vehicles and hybrid vehicles (having both internal combustion engines and electric motor drives) have been proposed.

Vehicles have a drive line or 'powertrain', between the engine and the surface over which the vehicle is to be driven. This includes the transmission, driveshafts, differentials, and the drive wheels or tracks. This drive line necessarily incorporates a number of components each of which may have a degree of free-play, known as backlash. As a result, step changes in torque provided by the engine can give rise to very rapid acceleration followed by a very rapid step-like deceleration as the components in the drive line mesh. Vehicle drive line systems also exhibit a degree of 'wind-up' in which deformation of components in the drive line causes them to store elastic energy as the engine applies torque. This 'wind-up' is associated with torsional stiffness/elasticity in drive shafts and with the resilience of tyres, suspension and other components.

Electric motors have a low mass and low moment of inertia. A typical internal combustion engine has very substantial mass and is generally coupled to the drive line using a flywheel which itself possesses a large moment of inertia. In vehicles powered by electrical traction motors there is generally a need to reduce the weight of the vehicle so the use of large flywheels is impractical. The inventors in the present case have appreciated a problem which arises in electric vehicles having 'soft' transmissions exhibiting backlash and/or 'wind-up'. In such systems, where there is a rapid change in the torque provided by the motor (for example when the vehicle accelerates from rest or as the torque demands made of the motor changes from positive to negative e.g reverses direction) the backlash in the transmission means that initially the motor can accelerate unimpeded. When the components in the drive line mesh then the inertia of the vehicle is suddenly coupled to the motor by the drive line providing a step-change in the load on the motor. The 'wind-up' (or resilience) in the drive line means that the some of the associated shock is temporarily absorbed by torsion and deformation of components in the drive line. In an electric vehicle, the moment of inertia of the motor is low compared with the vehicle/drive line so some of the stored energy is driven back into the motor. The result is a further step change in the torque output from the motor and the cycle repeats itself. The lack of damping in the system and the high torque to inertia ratio means that, in some circumstances, this feedback loop gives rise to oscillations in the motor speed. In other words, the combination of step changes in torque and the resilient nature of the vehicle drive line may give rise to oscillatory characteristics. In an electric vehicle the motor has low moment of inertia so is unable to apply the kind of damping provided by an internal combustion engine and flywheel. As a result, electric vehicles may behave as under-damped oscillators and the experience of the driver is that the response of the vehicle judders or jolts in response to acceleration and can cause increased motor noise. Some aspects and examples of the invention aim to address at least a part of the above described technical problem.

AC Electric Motors and Motor Controller Aspects

In an aspect there is provided an electric motor controller having a plurality of electronic or electrical components distributed symmetrically about an axis of symmetry of the controller. This has the advantage that a single controller circuit board can be manufactured and simply rotated to enable controllers to be stacked together back-to-back with common input/output couplings. The inventors in the present case have appreciated that despite the perceived problems of arranging multiple heat sources in close proximity it is advantageous to assemble electric motor controllers together and that, without this symmetry it is necessary to provide different "right-handed" and "left-handed" controllers, or to adapt input/output couplings where controllers are to be assembled together.

An electric motor controller may comprise at least one power supply input coupling and a monitoring coupling adapted for monitoring an operational parameter of another controller, wherein the monitoring coupling and the power supply input coupling are disposed in positions which are mutually symmetric about the axis of symmetry of the controller. This has the advantage that monitoring of operation of one controller (such as the current drawn from a power supply) can be monitored by an adjacent controller board using compact, short physical connections.

In some possibilities an electric motor controller comprises first, second and third output couplings for providing respective first, second and third motor control output signals and comprises a control means operable to cause the third output coupling to provide the first motor control output signal and to cause the first output coupling to provide the third motor control output signal such that the first and third motor control output signals are transposed. This has the advantage that two identical controllers can be assembled back to back to provide three-phase outputs in the same physical orientation with respect to the controllers.

In some possibilities said plurality of components and/or at least one of the input and output couplings are arranged on a first face of the controller, the controller comprising at least one power transistor arranged on a second face of the controller, opposite to the first face. This has the advantage of enabling a pair of electric motor controllers to be assembled to a single heat sink disposed between the controllers because the transistors of the controllers can be thermally coupled to the heat sink. It is also possible to provide first and second electric motors, wherein the first electric motor is disposed adjacent the first face of one of the electric motor controllers and the second electric motor is disposed adjacent the first face of the other electric motor controller to enable the heat sink and the electric motors to be thermally coupled to a single cooling manifold. This further simplifies the arrangement of motors and controllers because a single cooling system can be provided with a single pair of fluid couplings for the in flow of and out flow of cooling fluid through the manifold.

In an aspect there is provided an electric motor controller comprising at least one output coupling, wherein the output coupling is disposed symmetrically about an axis of the controller. This symmetry enables the controller to be assembled with another controller and with electric motors and cooling apparatus in a manner that reduces the weight, volume and complexity of the assembly.

In one example, there is provided an electric motor controller comprising a plurality of output couplings, wherein the output couplings are disposed symmetrically on a front face the controller about an axis of symmetry of that face. In some examples at least one of the couplings is not disposed on the axis. In another example, there is provided a motor controller comprising three output couplings. The output couplings may be disposed symmetrically on a front face of the controller about an axis of that face, the face of the controller may be just the front face of a circuit board on which the controller components are arranged. Preferably at least one of the couplings is not disposed on the axis. In examples where both of a first and second controller have this arrangement of output terminals, the output terminals of the first controller provide a mirror-image to the output terminals of a second controller when the controllers are aligned back-to-back.

In an embodiment a plurality of controllers as described herein may be stacked together in a housing without being coupled to a motor or motors. This enables compact and efficient packaging of the controllers whilst the motor(s) can be arranged separately.

Also described herein is a modular motor-controller assembly comprising motor-controller assemblies wherein each motor-controller assembly comprises an electric motor controller and an electric motor coupled to the electric motor controller, and cooling apparatus configured to cool the motors and controllers. The cooling apparatus comprises a heat sink. In one possibility, each of the controllers comprises one output coupling, wherein the output coupling is disposed symmetrically about an axis of the controller. In another possibility, each of the controllers comprises a plurality of output couplings. The output couplings may be disposed symmetrically on a face of the controller about an axis of symmetry of that face. In some examples at least one of the couplings is not disposed on the axis. In another possibility, each of the controllers comprises three output couplings, wherein the output couplings are disposed symmetrically on a face of the controller about an axis of that face, and wherein at least one of the couplings is not disposed on the axis. The face of the controller may be an external face, or in some examples the face may be the surface of the circuit board which carries the electronic components of the controller. In one possibility the controllers have output couplings disposed in symmetrical positions about an axis of symmetry of the controller. A heat sink may be provided between the controllers and/or the motors. A cooling manifold may be provided to cool the heat sinks of the controllers/motors. In one possibility, the heat sink is integrated with the cooling manifold.

Using this arrangement, only one set of cooling apparatus need be provided for two motor-controller assemblies, with the effect that weight, volume and complexity are reduced. A further advantage is that the provision of controllers having symmetrically identical output couplings allows the use of motors having the same design specification. A further advantage is that the modular assembly may be provided within an enclosure, providing convenient handling of the assembly and increased ease of assembling it within a vehicle or vehicle engine bay. The enclosure may provide electrical connections and fluid coolant couplings configured to serve both controllers and/or both motors, thereby further reducing weight, size and complexity of the apparatus.

In one example, the assembly is configured to provide differential drive. In one possibility, differential drive may be used to drive front and back wheels of a vehicle. In another possibility, differential drive may be used to drive left and right wheels of a vehicle. In another example, the controllers of the assembly may be coupled to coordinate driving of the motors.

In an aspect there is provided an electric motor controller for an electric motor comprising a plurality of output couplings and at least one input coupling, wherein the plurality of output couplings are disposed symmetrically about an axis of symmetry of a face of the controller. In some possibilities, the controller comprises a plurality of output couplings, wherein the output couplings are disposed symmetrically on a face of the controller about an axis of that face, and wherein at least one of the couplings is not disposed on the axis. In some possibilities, the controller comprises three output couplings, wherein the output couplings are disposed symmetrically on a face of the controller about an axis of that face, and wherein at least one of the couplings is not disposed on the axis. In some possibilities, the controller comprises at least one supply contact to receive a power input, and an inverter, preferably wherein at least one supply contact comprises two supply contacts. In some possibilities, the controller comprises the at least one supply contact and the output couplings are disposed on a front surface of the controller and the inverter is disposed on a back surface of the controller. In some possibilities, the controller comprises supply contacts to receive a DC input, three output contacts and an inverter for converting the DC input to a three-phase AC output. In some possibilities, the inverter is a semiconductor device such as an IGBT inverter or a MOSFET inverter. In some possibilities, the controller comprises first and second supply contacts wherein the first supply contact is configured for coupling to a first terminal of a power source the second contact is configured for coupling to a second terminal of said power source and is arranged to enable a mutually similar controller disposed adjacent the back face of the controller to couple to the second contact for monitoring current flow through the second contact. In some possibilities, the conductive strips are provided to couple between a supply contact and respective power source terminals. In some possibilities, the controller is provided within a casing which provides couplings to connect the controller to a power supply. In some possibilities, the couplings to connect the controller to the power supply are provided within an extension of the casing.

In some examples there is provided a motor-controller assembly comprising an electric motor controller and an electric motor coupled to the electric motor controller. In some possibilities, the assembly comprises a plurality of controllers each coupled to a motor and cooling apparatus to cool the motors and controllers. The cooling apparatus may comprise at least one heat sink, and wherein the controllers are arranged adjacent one another such that two adjacent controllers share a heat sink. Preferably there are two motor-controller assemblies and a common cooling apparatus to cool the motors and controllers. In some possibilities, the cooling apparatus comprises a heat sink in thermal contact with the controllers. In some possibilities, the controllers are arranged back-to-back and the heat sink is provided between the controllers, the heat sink being in thermal contact with the back surfaces of the controllers. In some possibilities, the cooling apparatus comprises a cooling manifold in thermal contact with the motors. In some possibilities, the controllers are symmetrically identical. In some possibilities, one controller has an orientation relative to the other such that the output couplings of the controllers are aligned when the controllers are arranged back to back. In some possibilities, components of one of the controllers are a geometrical mirror-image of the components of the other controller when the controllers are arranged back to back. In some possibilities, the controllers have the same design specification in respect of their components and the configuration of their components. In some possibilities, the controller casings are not rotationally symmetrical and one of the controllers is inverted relative to the controller casing of the other controller, such that the casings coincide when the controllers are arranged back to back. In some possibilities, supply couplings are provided within coincident extensions of the controller casings to connect the controllers to a power source. In some possibilities, each motor is adjacent a respective one of the controllers. In some possibilities, the motors have the same design specification. In some possibilities, the two motor-controller assemblies are disposed on an axis and wherein the motors are disposed so as to provide drive at respective ends of the axis. In some possibilities, the assembly is configured to enable the motors to produce a differential drive. In some possibilities, the controllers are coupled to coordinate driving of the motors.

In an aspect there is provided an electric motor controller having a front face and a rear face, the controller carrying a plurality of DC input couplings and a plurality of AC output couplings and a converter, the converter having inputs coupled to the DC input couplings and outputs coupled to the AC output couplings, the converter being configured to convert a received DC supply into an output AC supply, the AC output couplings being symmetrically disposed about an axis of symmetry of the controller on the front face of the controller. In some possibilities, at least one of the DC input couplings is symmetrically disposed about an axis of symmetry of the controller on the front face of the controller.

In some possibilities, the DC input couplings are coupled via respective conductive strips to corresponding power supply input couplings. In some possibilities, three DC input couplings are provided and two of the DC input couplings are coupled via respective copper strips to corresponding power supply input couplings. In some possibilities, the controller has a casing and the power supply input couplings are located in a casing extension.

In an aspect there is provided a kit comprising at least two electric motor controllers configured to be positioned back-to-back with their rear faces facing, for example wherein the electric motor controllers are configured to be positioned back-to-back with their rear faces facing and the casings of the electric motor controllers are mirror images of one another so that when the controllers are positioned back-to-back, the extensions enable connection of the power supply input couplings of the controllers to a power supply source via conductors passing through the extensions.

An electric motor-controller assembly may comprise an electric motor controller and a motor, and the controller and the motor may share a cooling system. There is also provided a modular motor assembly comprising a plurality of electric motor controllers and a respective motor for each electric motor controller, the electric motor controllers and motors being arranged such that adjacent electric motor controllers are positioned back-to-back and share a cooling system of the assembly. In some possibilities, the cooling system comprises at least one of heatsink and a coolant circulation system. In some possibilities, the cooling system comprises a cooling manifold extending over the motors and the heat sink. In an aspect there is provided an electric motor controller comprising output means for coupling to a motor, wherein the output means is symmetrically disposed on the face of the controller about an axis of symmetry of the controller.

In an aspect there is provided a vehicle having an electric motor controller according to any one described herein and/or a motor-controller assembly according to any one described herein. There is also provided an electric motor controller having a plurality of electronic or electrical components distributed symmetrically about an axis of symmetry of the controller. Preferably, the electric motor controller comprises at least one power supply input coupling and a monitoring coupling adapted for monitoring an operational parameter of another controller, wherein the monitoring coupling and the power supply input coupling are disposed in positions which are mutually symmetric about the axis of symmetry of the controller. In some possibilities, the controller comprises at least one motor control output coupling disposed symmetrically about an axis of symmetry of the controller. In some possibilities, the at least one motor control output coupling comprises a plurality of motor control output couplings. In some possibilities, the plurality of motor control output couplings comprise first, second and third output couplings for providing respective first, second and third motor control output signals and comprising a control means operable to cause the third output coupling to provide the first motor control output signal and to cause the first output coupling to provide the third motor control output signal such that the first and third motor control output signals are transposed. In some possibilities, said plurality of components and/or at least one of the input and output couplings are arranged on a first face of the controller, the controller comprising at least one power transistor arranged on a second face of the controller, opposite to the first face. There is also provided an apparatus comprising a pair of such electric motor controllers assembled to a heat sink disposed between the controllers to enable the transistors of the controllers to be thermally coupled to the heat sink. In some possibilities, the pair of controllers are arranged such that the monitoring coupling of each controller is aligned with the power supply input coupling of the other controller. In some possibilities the apparatus comprises first and second electric motors, wherein the first electric motor is disposed adjacent the first face of one of the electric motor controllers and the second electric motor is disposed adjacent the first face of the other electric motor controller to enable the heat sink and the electric motors to be thermally coupled to a single cooling manifold. Preferably the apparatus further comprises the cooling manifold and the cooling manifold may comprise a fluid flow path for a flow of cooling fluid to cool the manifold, preferably wherein the fluid comprises a liquid. In some possibilities an electric motor is disposed adjacent the first face of the electric motor controller to enable the electric motor and the electric motor controller to be assembled to a heat sink disposed adjacent the second face of the electric motor controller to enable the at least one transistor to be thermally coupled to said heat sink. Preferably the apparatus comprises said heat sink. Preferably the apparatus comprises a cooling manifold adapted for coupling to the motor and to said heat sink.

In an aspect there is provided an electric motor assembly comprising an electric motor and a first electric motor controller thermally coupled to a heat sink, wherein the electric motor and the heat sink are thermally coupled to a single cooling manifold preferably further comprising a second electric motor and a second electric motor controller, wherein the second electric motor controller is thermally coupled to the heat sink and the second electric motor, is thermally coupled to the single cooling manifold. Preferably the cooling manifold comprises a fluid flow path for a flow of cooling fluid to cool the manifold, preferably wherein the fluid comprises a liquid. In some possibilities the electric motor controller(s) and electric motor(s) and heat sink are disposed in a common casing.

In an embodiment an electric motor controller comprised a plurality of coupling means each operable to provide one of: a DC input coupling to provide a DC supply to the converter; and a monitoring coupling configurable to carry a current transducer, wherein at least two of the additional coupling means are disposed symmetrically about an axis of symmetry of the controller. The monitoring coupling may comprise a through hole through the circuit board of the controller and/or may comprise a current transducer. This has the advantage that, when two of said controllers are arranged back-to back the DC supply coupling of one may be positioned adjacent a monitoring coupling of the other so that the DC supply can pass through the monitoring coupling to enable one controller to monitor the current drawn by the other controller.

Aspects Relating to DC Series Motors and the Control Thereof.

In an aspect there is provided an apparatus comprising: a DC series motor; and a first current supply configured to supply a first current to an armature of the DC series motor; and a second current supply configured to supply a second current to a field winding of the DC series motor, preferably further comprising a control means configured to control the second current supply to provide the second current based upon the first current. In an embodiment the first and second current supplies are derived from a single three-phase inverter circuit with each current supply being provided by one or more legs of the inverter circuit. In one example, the first current supply is provided by a first leg of the inverter circuit and the second current supply is provided by second and third legs of the inverter circuit. In another example the first current supply is provided by the first and second legs of the inverter circuit and the second current supply is provided by the third leg of the inverter circuit. The inventors in the present case have appreciated that by applying appropriate control signals, it is possible to use a three phase inverter circuit (e.g. a standard six switch inverter, usually applied to AC motors) to control a DC motor. This enables AC controllers to be retrofitted to existing DC motors to improve performance without the additional cost and resources required to replace a DC series motor with a conventional SEM.

In some possibilities, the first and second current supplies are configured to be controlled independently. In some possibilities, the first and second current supplies comprise a three-phase inverter circuit. In some possibilities, the armature is coupled between a first leg of the three phase inverter and a second leg of the three phase inverter, and wherein the field winding is coupled between a third leg of the three phase inverter and one of the negative and positive power supplies the field winding is coupled between a first leg of the three phase inverter and a second leg of the three phase inverter, and wherein the armature is coupled between a third leg of the three phase inverter and one of the negative and positive power supplies.

In some possibilities, the apparatus comprises a controller configured to control the first current supply to supply the first current based on a required torque output for the motor. In some possibilities, the controller is further configured to control the second current supply to supply the second current based on the first current.

In an aspect there is provided a method of controlling a DC series motor comprising: controlling a first current supply to supply an armature current to an armature of a DC series motor; and controlling a second current supply to supply a field current to a field winding of the DC series motor. In some possibilities, controlling the first current supply further comprises controlling the first current supply to supply the armature current based on a required torque output for the motor. In some possibilities, controlling the second current supply further comprises controlling the second current supply to supply the field current based on the armature current. In some possibilities, controlling the first current supply and controlling the second current supply further comprise controlling a three phase inverter circuit.

In an aspect there is provided a method of calculating a rotational speed of a DC series motor, the method comprising: obtaining an armature current value and a field current value associated with the motor; estimating a magnetic flux for the motor based on the armature current value and the field current value; obtaining a back emf value associated with the motor; and dividing the back emf value by the estimated magnetic flux to calculate the rotational speed of the motor. In some possibilities, estimating the magnetic flux comprises: determining a first magnetic flux component associated with the armature current value; determining a second magnetic flux component associated with the field current value; and summing the first and second magnetic flux components.

In some possibilities, the determining the first and second magnetic flux components comprises using one or more look up tables to identify a magnetic flux component associated with a current value.

In some possibilities, the DC series motor assembly comprises a DC series motor having an armature and a field winding in series with the armature, a three phase inverter circuit coupled to the DC series motor and a controller to control switching of switching elements of the three-phase inverter circuit to enable the three-phase inverter circuit to control the current through at least one of the armature and the field winding. In some possibilities, the controller is operable to control the current through the armature and through the field winding. In some possibilities, the controller is operable to control at least one of the magnitude and direction of the current through at least one of the armature and the field winding. In some possibilities, the controller is operable to control the direction of the current through one of the armature and the field winding and the magnitude of the current through the armature and the field winding. In some possibilities, the three-phase inverter circuit has first, second and third legs each coupled between positive and negative power supply lines of the assembly, each leg comprising first and second switching elements coupled together at a node, each switching element having a control gate controlled by the controller. In some possibilities, the armature is coupled between the node of the first leg and one of the positive and negative power supply lines and the field winding is coupled between the nodes of the first and second legs. In some possibilities, the armature is coupled between the nodes of the first and second legs and the field winding is coupled between the node of the third leg and one of the positive and negative power supply lines. In some possibilities, the armature is coupled between the nodes of the first and second legs and the field winding is coupled between the nodes of the second and third legs. In some possibilities, the switching elements of the three-phase inverter circuit comprise semiconductor switching elements. In some possibilities, the switching elements comprise voltage controlled impedances such as insulated gate bipolar transistors (IGBTs), or MOSFETs, or IGFETs, or bipolar junction transistors (BJTs), or junction field effect transistors. In some possibilities, the three-phase inverter circuit comprises a three-phase inverter circuit designed for controlling an AC motor.

In an aspect there is provided a DC series motor assembly comprising: a DC series motor having an armature and a field winding in series with the armature; and a controller for controlling the current through at least one of the armature and the field winding, wherein the controller comprises a three-phase inverter circuit designed for controlling an AC motor.

In an aspect the invention relates to use of a three-phase inverter circuit designed for controlling an AC motor to control the current through at least one of the armature and field winding of a DC series motor. In another aspect the invention relates to an apparatus for controlling a DC series motor comprising: a first current control configured to control the supply of a first current to one of an armature of the DC series motor and a field winding of the DC series motor; a second current control configured to control the supply of a second current to the other one of the armature of the DC series motor and the field winding of the DC series motor, wherein the first current control is configured to control the first current based on the second current. In some possibilities, the first current control is configured to control the supply of the first current to the armature of the DC series motor and the second current control is configured to control the supply of the second current to the field winding of the DC series motor. In some possibilities, the first current control is configured to control the supply of the first current to the field winding of the DC series motor and the second current control is configured to control the supply of the second current to the armature of the DC series motor. In some possibilities, at least one of the first current control and the second current control is operable to control current by applying a control voltage to control at least one leg of an inverter circuit for controlling an AC motor. In some possibilities, the inverter circuit comprises a multi-phase inverter circuit.

In some possibilities, the inverter circuit comprises a three phase inverter circuit, the apparatus may further comprise the inverter circuit. In some possibilities, the inverter circuit is designed for controlling an AC motor. In some possibilities, the apparatus may comprise the DC series motor and/or a memory storing a look-up table and in which controlling the first current based on the second current comprises controlling the second current value based on the first current and the look-up table.

In an aspect there is provided a method of adapting the control system of a DC series motor comprising providing an inverter circuit to supply current to the armature and field windings of the DC motor and providing a control means configured to control the inverter such that one of the armature current and the field current is controlled based on the other one of the armature current and the field current.

Examples of the invention may comprise control means implemented in software, middleware, firmware or hardware or any combination thereof. Embodiments of the invention comprise computer program products comprising program instructions to program a processor to perform one or more of the methods described herein, such products may be provided on computer readable storage media or in the form of a computer readable signal for transmission over a network. Embodiments of the invention provide computer readable storage media and computer readable signals carrying data structures, media data files or databases according to any of those described herein.

Apparatus aspects may be applied to method aspects and vice versa. The skilled reader will appreciate that apparatus embodiments may be adapted to implement features of method embodiments and that one or more features of any of the embodiments described herein, whether defined in the body of the description or in the claims, may be independently combined with any of the other embodiments described herein.

Aspects Relating to Dual Controller Cross Check

In an aspect there is provided an electric motor controller comprising: a health indicator for providing an output signal to indicate operation of a power provider; and, a failsafe, comprising signal receiving means for receiving a health indicator signal from another electric motor controller, and a control means arranged to control operation of said power provider based on the indicator signal from said other electric motor controller. In some possibilities the failsafe is configured to enable activation of the power provider based on the indicator signal. In some possibilities the failsafe is configured not to enable activation of the power provider if the indicator signal is not received. In some possibilities the failsafe is configured to activate the power provider in response to receiving the indicator signal.

In some possibilities the control means is configured to determine at least one parameter of the indicator signal and to control the power provider based on the at least one parameter. In some possibilities the at least one parameter comprises one of: a DC voltage level; a frequency; a phase; peak to peak amplitude; RMS amplitude; and a duty cycle. In some possibilities the health indicator is configured to provide a time varying output signal to indicate operation of the power provider. In some possibilities the time varying signal comprises a pulsed output signal such as a square wave. In some possibilities the health indicator is configured to provide the indicator signal only in the event that it is determined that the electric motor controller is operating safely, for example based on a determination that components of the motor controller are functioning and/or that the signal from another similar controller is consistent with safe operation of a vehicle. In some possibilities the health indicator is configured to provide the indicator signal based on a determination of at least one operational parameter. In some possibilities the at least one operational parameter is selected from a list comprising: the direction of a DC current of the motor controller; the direction of a DC current of the other motor controller; a key switch voltage; the temperature of the power transistors (IGBTs) of the controller; the temperature of control logic of the controller; the voltage and/or temperature of DC link tracks associated with the controller; ADC calibration voltages; analogue inputs; one or more programmable or non-programmable supply voltage (Vcc) monitors; sin-cos encoder data; resolver measurements; speed feedback measurements; other digital inputs and motor PTC inputs.

In some possibilities the determination comprises comparing the at least one operational parameter with a threshold value.

In some possibilities the electric motor controller further comprises the power provider, wherein the power provider is operable to provide a power supply for an electric traction motor.

In some possibilities the controller comprises a control means configured to control the power supply of a first electric traction motor based on a comparison of the drive direction of the electric motor controller with the drive direction of a second electric motor controller. In some possibilities the controller comprises a comparer operable to compare the drive direction of the electric motor controller with the drive direction of said second electric motor controller. In some possibilities the controller comprises at least one of: a sensor for sensing the drive direction of the electric motor controller; and a sensor for sensing the drive direction of said second electric motor controller. In some possibilities sensing drive direction comprises sensing the direction of a power supply current of the electric motor controller. In some possibilities the controller comprises a power provider for providing a power supply for said first electric traction motor.

Aspects of the invention comprise drive apparatus for an electric vehicle and or a vehicle comprising said drive apparatus.

In an aspect there is provided a method of operating an electric motor controller, the method comprising operating an electric motor in the manner defined herein and/or substantially as described with reference to any one of FIGS. 12 to 15. There is also provided a computer program product comprising program instructions operable to program a processor of an electric motor controller to control an electric motor by providing a drive signal to the electric motor based on monitoring a supply current of a second electric motor controller. There is also provided a computer program product comprising program instructions operable to program a processor of an electric motor controller to control an electric motor by providing a drive signal to the electric motor in dependence upon a control signal from a second electric motor controller.

Motor Oscillation Damping Aspects

In an aspect there is provided a torque control apparatus for an electric vehicle, the apparatus comprising: a controller coupled to receive a torque demand signal from a driver user interface or vehicle controller, and a speed sensor signal indicating angular speed of an electric motor; wherein the controller is configured to provide a modified torque demand control signal based on the torque demand signal and the speed sensor signal. This has the advantage that the rapid torque response of the motor can be modified to ensure smooth operation of the vehicle.

In one possibility the apparatus comprises a filter to filter the speed sensor signal. In one possibility the filter is configured to filter the sensed speed signal to emphasise frequency components associated with selected frequency components relative to other frequency components of the sensed speed signal, in some possibilities the selected frequency components are associated with characteristic frequencies of the vehicle's drive line.

The inventor's in the present case have recognised that a vehicle drive line may have a characteristic frequency, for example associated with the torsional stiffness of components in the vehicle drive line and/or their respective moment's of inertia, and that by applying a selective filter a vehicle's characteristic oscillatory response to changes in torque can be selectively damped without compromising the vehicle's responsiveness.

In one possibility filtering comprises attenuating frequency components not associated with the characteristic frequencies of the vehicle's drive line, for example using a notch filter configured to attenuate at least one noise frequency component. The inventors in the present case have appreciated that there are particular noise sources characteristic of a vehicle system which may compromise torque control.

In some possibilities the controller is operable to vary the transfer function of the filter, for example in response to an operational condition of the vehicle. This has the advantage that some sources of electrical noise have amplitude and/or frequency characteristics which may vary dependent on operational conditions such as the speed of the vehicle and/or the motor.

In one possibility the controller is configured to subtract a subtraction signal based from the received torque demand signal, wherein the subtraction signal is based on the sensed speed signal, for example wherein the controller is configured to limit the subtraction signal such that the magnitude of the subtraction signal does not exceed a reference signal level. This has the advantage that the vehicle's responsiveness to an operator control is not unduly constrained by the oscillation damping system. Preferably the subtraction signal is based on the rate of change of the sensed speed signal.

In some possibilities the reference signal level is based on the maximum torque demand signal for the motor and in some possibilities the controller is operable to configure the reference signal level. This has the advantage that the response of the vehicle can be 'tuned' according to operational need, for example due to loading of the vehicle. These examples of the invention have the advantage that the damping/responsiveness of motor control can be adjusted during use of a vehicle.

In some possibilities the controller is configured to provide a substitute torque demand signal based on a comparison of the modified torque demand signal and the received torque demand signal. For example where the modified torque demand signal is of opposite sign to the torque demand signal the controller may be configured to substitute a zero torque demand signal for the modified signal. This has the advantage that damping of motor speed oscillations cannot give rise to surprising or unwanted reversals of the motor torque output.

In some examples the substitute torque demand signal is selected from a list comprising at least one predetermined torque demand signal value, for example the controller may be configured to select the substitute torque demand signal based on an operational condition of the vehicle such as the speed of the vehicle and/or the motor speed. This has the advantage that a substitute torque demand can be selected so that, for example the vehicle torque demand need not be suddenly fixed to zero but can be set to a low value consistent with instantaneous vehicle or motor speed.

In one possibility the speed sensor signal comprises a speed sensor signal based on sensing the angular speed of a wheel of the vehicle. This has the advantage that the real speed of the vehicle can be used to control motor torque demand. In some possibilities the speed sensor signal comprises a signal based on sensing the motor angular speed and a signal based on sensing the angular speed of a wheel of the vehicle.

In an aspect there is provided a method comprising: receiving a torque demand control signal to be applied to an electric motor controller for a vehicle electric motor; receiving a sensed speed signal indicating the angular speed of said electric motor; and determining a modified torque demand signal based on the received torque demand signal and the sensed speed signal. Preferably the sensed speed signal comprises the rate of change of angular speed. In some possibilities the speed sensor signal comprises a sensed torque signal.

In some possibilities the method comprises subtracting a subtraction signal based on the sensed speed signal from the received torque demand signal to determine the modified torque demand signal. For example, the subtraction signal may be limited such that the magnitude of the subtraction signal does not exceed a reference value. This has the advantage that adjustments to the torque demand to reduce motor oscillations do not compromise the responsiveness of the vehicle. In some examples the reference value may be selected so that the maximum adjustment to forward torque does not exceed a first reference value and the maximum adjustment to reverse torque does not exceed a second reference value. This has the advantage that the vehicle behaviour can be adapted to suit modes of operation.

Examples of the invention provide an electronic device comprising a torque control apparatus according to any of those described herein. Examples of the invention provide a vehicle comprising an electric motor and a torque control apparatus according to any of those described herein.

Although described with reference to a vehicle the problems of motor speed oscillations may occur in other systems in which electric motors are used and embodiments of the invention address the problem above described problem in systems other than vehicles, for example in some possibilities the method may be applied to control electric motors in hydraulic systems. In an aspect there is provided a method of controlling an electric motor comprising receiving a control signal indicating a torque demand; receiving a sensor signal based on speed output of the motor; modifying the control signal based on the sensor; and providing the modified control signal to the motor.

In an aspect there is provided an electric motor control system comprising a control input for receiving a control signal; a sense input for receiving a sensed signal based on motor speed output; and a control means adapted to modify the control signal based on the sensed signal and to provide the modified control signal to the motor. Preferably the sensed signal is based on the rate of change of angular speed of the motor.

Examples of the invention may be implemented in hardware (such as FGPAs or ASICs or other hardware), or in software, middleware, firmware or any combination thereof. Embodiments of the invention comprise computer program products comprising program instructions to program a processor to perform one or more of the methods described herein, such products may be provided on computer readable storage media or in the form of a computer readable signal for transmission over a network. Embodiments of the invention provide computer readable storage media and computer readable signals carrying data structures, media data files or databases according to any of those described herein.

Any of one or more features of any of the embodiments described herein, whether defined in the body of the description or in the claims may be independently combined with any of the other embodiments described herein.

BRIEF DESCRIPTION OF FIGURES

Embodiments of the invention will now be described in detail, by way of example only, with reference to the accompanying drawings, in which.

AC Electric Motors and Motor Controllers

Figure 1:
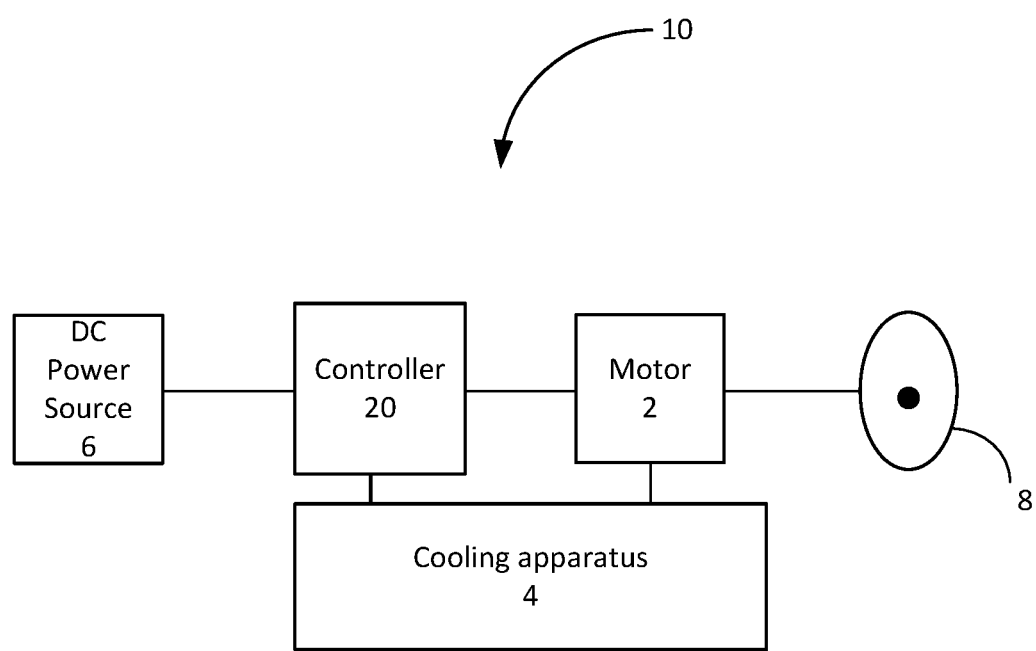
FIG. 1 illustrates a system comprising an electric motor and controller.

In overview, the electric motor system 10 of FIG. 1 comprises motor 2 and a controller 20 to control operation of the motor. The controller 20 is configured to derive a three-phase alternating current (AC) supply for the motor 2 from a direct current (DC) power source 6, in this example a battery. The electric motor system 10 also comprises a cooling apparatus 4. Cooling apparatus 4 is coupled to both the motor 2 and controller 20 to remove heat produced by the operation of the motor 2 and controller 20. A drive output of the motor provides torque to drive a drive plate 8 coupled to a drive axle of a vehicle.

The controller 20 is configured to perform inversion, filtering and conditioning processing on the DC output of the power source 6 to provide the motor with the required AC power source.

The controller 20 comprises an inverter 28 to convert a DC input to a three-phase AC output for use by the motor 2. Any suitable form of inverter may be used. In a preferred example, an insulated gate bipolar transistor (IGBT) inverter is used. In some cases MOSFETs or other IGFETs may also be used. Preferred characteristics of the IGBT converter include high efficiency and fast switching.

Figure 2A:
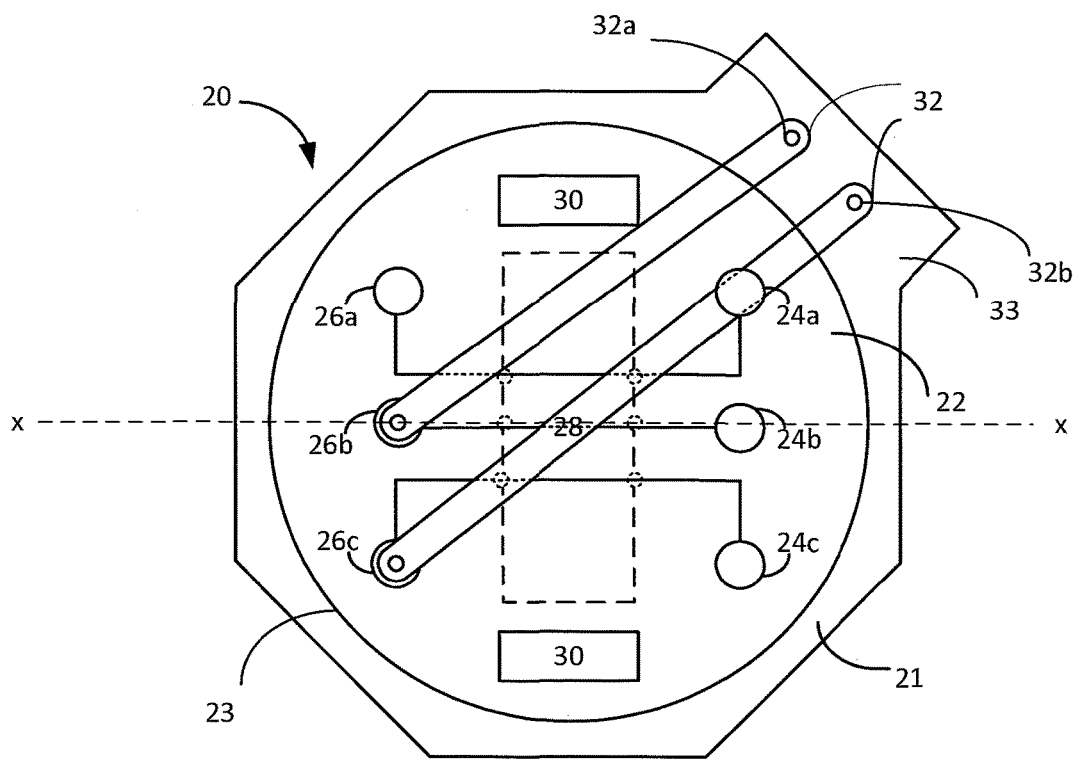
FIGS. 2A and 2B illustrate the front surfaces of first and second controllers according to the invention.

FIG. 2A shows a front view of one example of a controller 20 comprising a printed circuit board (PCB) 22. FIG. 2A also shows a controller casing 21 within which the controller is housed. The PCB 22 carries supply contact fittings 26a, 26b and 26c each fitting may comprise a current transducer for sensing current passed through the fitting. Supply contact fitting 26b comprises a supply contact B+ for coupling to a first terminal of a DC supply, not shown. Supply contact fitting 26c comprises supply contact B− for coupling to a second terminal of the DC supply (not shown). The PCB 22 also carries AC output terminals 24a, 24b and 24c and an inverter 28 (shown in dashed lines in FIG. 2A). Supply contact B+ is electrically coupled by copper arm 35b to battery terminal 32a and 32b mounted to extension 33 of the casing 21 through which wires run to provide for connection to the power source 6. Supply contact B− is electrically coupled by copper arm 35a to battery terminal 32b mounted to the extension of the casing 21.

The DC supply contacts 26b, 26c are coupled to respective inputs of the inverter 28. The inverter 28 outputs are coupled to AC output terminals 24a, 24b, 24c. Each of the output terminals is operable to be coupled to a respective phase winding of a motor 2.

The AC output terminals 24a, 24b, 24c are disposed symmetrically about an axis x-x of PCB 22. In this example, the DC supply contact fittings 26a, 26b, 26c are similarly symmetrically disposed.

PCB 22 may comprise other functionality 30 which may include, for example, microprocessors, power supplies, capacitors and inductors configured for control filtering and conditioning.

Figure 2B:
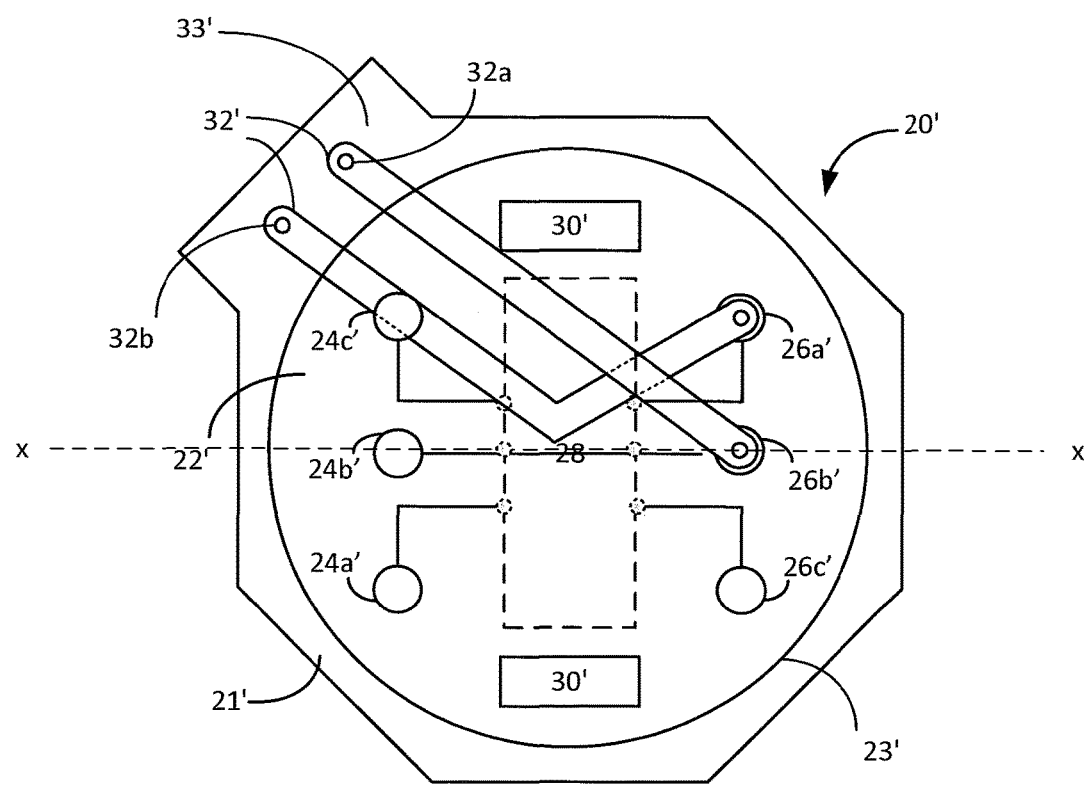

FIG. 2B shows a front view of a second controller 20' comprising PCB 22'. FIG. 2B also shows controller casing 21' within which the controller 20' is housed. Controller 20' is the same as controller 20 except for the orientation of the PCB 22'. Compared to PCB 22 and controller casing 21, PCB 22' is rotated through 180 degree relative to its controller casing 21'. Compared to controller casing 21 and PCB 22, controller casing 21' is inverted relative to PCB 22' with respect to an axis normal to the axis x-x.

Figure 3:
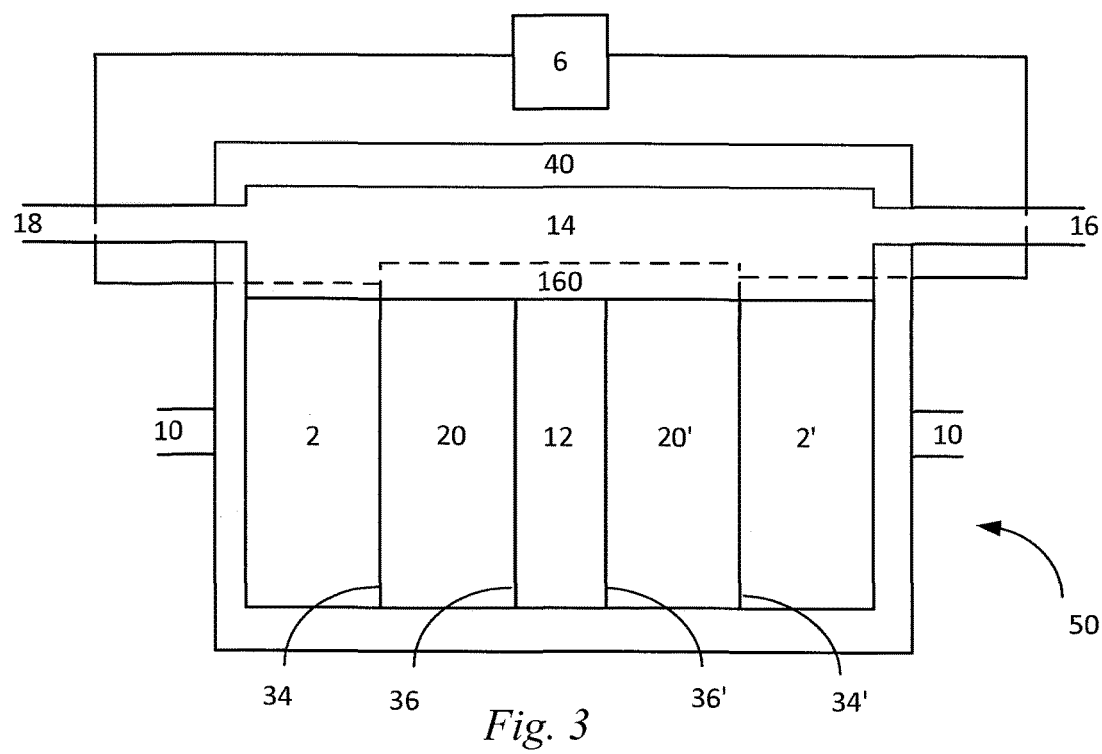
FIG. 3 shows a modular motor-controller assembly comprising two motors and two controllers with a heat sink serving both controllers and a cooling manifold.

The effect of the PCB rotation is that when the controllers are disposed with their edges 23, 23' aligned and their back faces towards one another, the output terminals 24a', 24b', 24c' of controller 20' are aligned with the output terminals 24a, 24b, 24c. The supply contact fittings 26a, 26b, 26c of controller 20 are aligned with the supply contact fittings 26a', 26b', 26c' of controller 20'. The casing inversion means that the profiles of controller casings 21, 21' coincide. When the controllers are arranged in this way, a heat sink may be positioned between their respective back faces adjacent the power transistors of the inventors (the principal heat source is the controller). The heat sink operates to cool both controllers simultaneously, so that separate heat sinks need not be provided for the controllers. FIG. 3 illustrates an arrangement where first and second controllers are arranged on an axis 10 either side of a heat sink 12.

The controllers described above enable formation of modular assemblies consisting of sets of motors and associated controllers. The option of having identical PCBs 22, 22' which can simply be rotated for assembly together in a back to back formation simplifies production of the PCBs and assembly requirements of modular stacks of motors and controllers.

Referring in more detail to FIG. 3, there is illustrated a modular assembly 50 contained within an enclosure 40 and comprising first and second motors 2, 2', first and second controllers 20, 20' and common cooling apparatus comprising a heat sink 12 and a cooling manifold 14, and supply couplings 160 running through the extensions 33 to enable the battery terminals 32a and 32b to be coupled to power source 6.

The motors and controllers are disposed on an axis 10 configured to be coupled to the drive plate 8. First motor 2 is disposed on a first end of the axis 10. First motor 2 is adjacent the front face 34 of the first controller 20. The back face 36 of the first controller 20 carrying the inverter is adjacent and in thermal contact with heat sink 12. Heat sink 12 is also adjacent and in thermal contact with the back face 36' of the second controller 20'. The front face 34' of the second controller 20' is adjacent second motor 2' which is disposed on the second end of the axis 10. First and second motors and first and second controllers share a cooling manifold 14 which may be integrated with the enclosure 40. Cooling manifold 14 has an inlet 16 and an outlet 18. The cooling manifold 14 is in physical and thermal contact with heat sink 12 and is in thermal contact with first and second motors 2, 2'.

DC supply couplings 160 are coupled to the first and second controllers 20, 20'. The first motor 2 is in electrical contact with the first controller 20. Electrical contact is achieved through an electrical coupling between each of the output terminals 24a, 24b, 24c and a phase winding in the motor 2. The second motor 2' is in electrical contact with the second controller 20'. Electrical contact is achieved through an electrical coupling between each of the output terminals 24a', 24b', 24c' and a phase winding in the motor 2'.

DC power is supplied to controllers 20 and 20' via DC supply couplings 160. The first controller 20 converts the DC supply to three-phase AC for the first motor 2. The AC signal produces a torque on the rotor of the first motor 2 which produces a drive at the first end of the axis 10. The second controller 20' and motor 2' operate in the same way to produce drive at the second end of the axis 10. The motor outputs may be coupled to respective drive coupling, e.g. drive plates, to drive respective drive shafts.

In one possibility the first and second controllers 20, 20' are in electrical contact. That is, DC terminals B+, B− of the first controller 20 are electrically coupled to the corresponding terminals B+, B− of the second controller 20'. Each controller has a B+ terminal on the front face (26b, 26b') and one B-terminal on the rear face (26a for controller 20 and 26c' on controller 20'). The B− terminals pass through a current sensor on the other unit allowing monitoring of performance of both controllers to be done by each controller in the pair.

Figure 4:
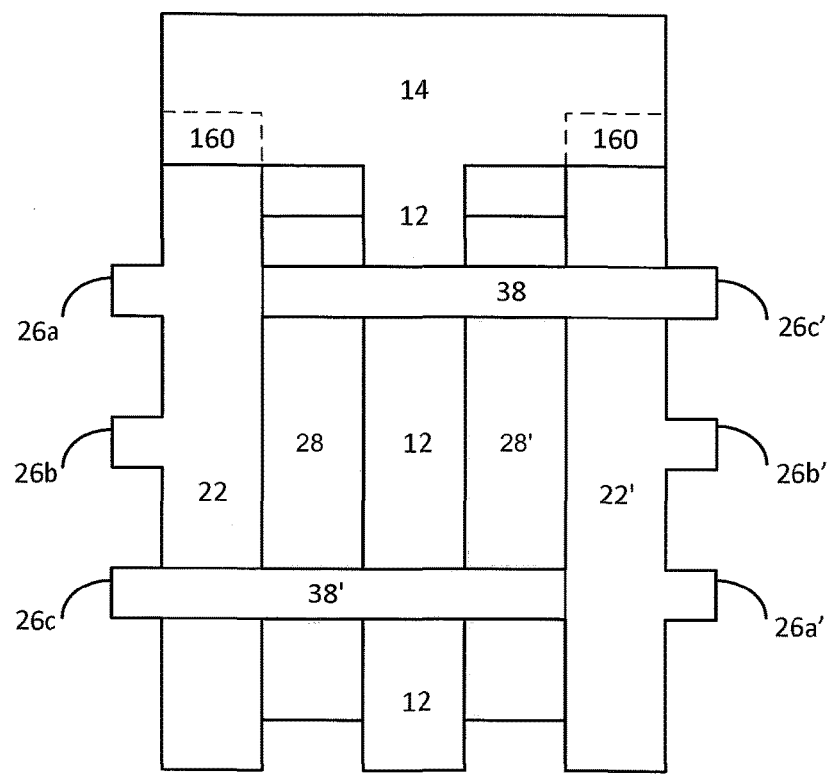
FIG. 4 shows first and second controllers in profile, each controller having an extended terminal for monitoring current on the other controller.
Figure 6:
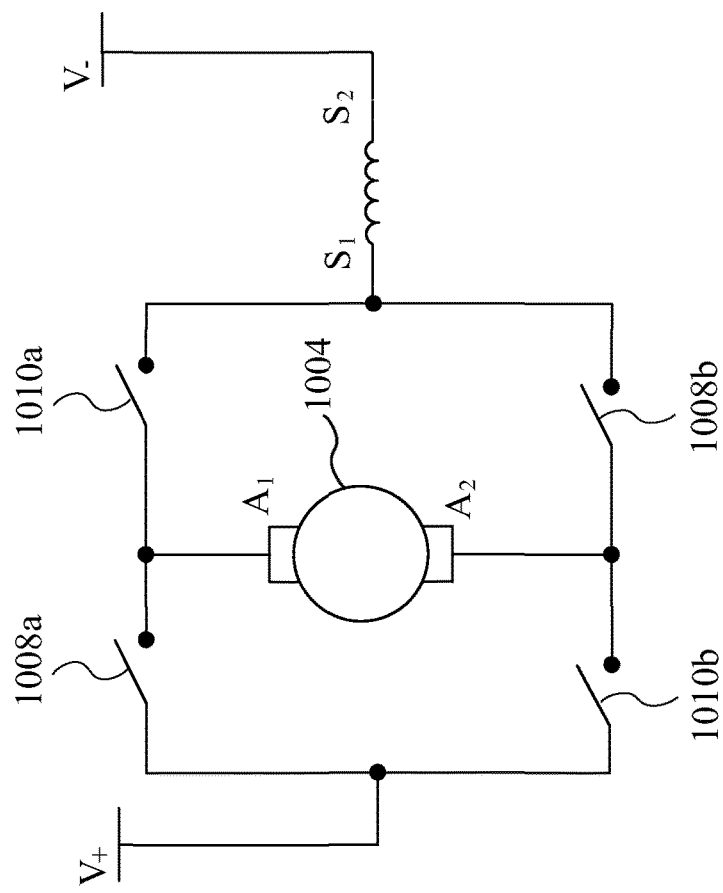
FIG. 6 schematically illustrates a DC motor and a circuit for motor reversal.

The cooling system operates as follows. Cooling manifold 14 receives fluid coolant via inlet 16. The coolant absorbs heat from the first and second motors 2, 2'. The manifold 14 also provides fluid to the heat sink 12, which removes heat from the inverters 28, 28' disposed on the respective back surfaces 34, 34' of the first and second controllers 20, 20' (as shown in FIG. 4). In this example, fluid supplied to the heat sink circulates back to the cooling manifold. Cooling fluid leaves the cooling manifold via outlet 18.

In a possibility, a plurality of motors and controllers in a ratio of one motor to one controller are disposed on the axis 10 and within the enclosure 40. Controllers arranged back to back may share a heat sink. At most, two controllers may share a given heat sink. All heat sinks are in physical and thermal contact with the cooling manifold 14. Generally the motors will stacked at the ends of the axis 10 in order that drive be produced at the ends of the axis 10.

An advantage of the modular assembly 50 is that first and second controllers 20, 20' share a cooling unit, as described above, rather than each controller being provided with a cooling unit. Therefore, in any engine having more than one motor-controller pairing, the modular assembly substantially reduces the engine's weight and volume by eliminating at least one cooling unit 4.

In a possibility, the enclosure 40 has integrated electrical connections (e.g. for phase to stator windings, rotor position encoder and DC input). These serve to further optimize size and weight of the combined apparatus.

It will be appreciated that the relative rotation of the second PCB 22' results in the order of the electrical terminals being inverted compared to those of the first PCB 22. This means that, when the first and second controllers 20, 20' are arranged as shown in FIG. 3, their output terminals 24, 24' are aligned as follows. Terminal 24a is aligned with 24c'. Terminal 24b is aligned with 24b'. Terminal 24c is aligned with 24a'. In this example, terminals 24a and 24a' output a first electrical phase, terminals 24b and 24b' output a second phase and terminals 24c and 24c' output a third phase. When identical motors are connected to the controllers as shown in FIG. 3 and identical motor-controller couplings are used, motors 2 and 2' produce a torque in opposite directions. It may be desirable that the output terminals of the controllers line up so that terminals outputting like phases are aligned. Optionally, therefore, a switch may be provided on the first PCB 20 or the second PCB 20' to invert the phases output from terminals 24a and 24c and 24a' and 24c', respectively. Alternatively, circuitry may be provided to switch the phases of those terminals automatically. In possibilities where multiple controllers and motors are stacked up alongside one another, such automatic switching may serve to coordinate the phase outputs across the whole stack of controllers.

It follows from the rotation of PCB 22' that the supply contact fittings 26' are also inverted. The unused contact fitting can be used to perform an additional function, such as monitoring current through another controller. An arrangement for performing current monitoring is illustrated in FIG. 4, which shows first and second controllers 20, 20' arranged back to back either side of a common heat sink 12. In the example shown, the unused contact 26c of the first controller 20 is coupled to a current monitoring transducer of the second controller 20'. The coupling is achieved by means of an extended terminal 38 passing through the inverter 22 and the heat sink 12. Similarly, the unused contact 26a' of the second controller 20' is coupled to a current monitoring output of the first controller 20 via an extended terminal 38' passing through inverter 28' and heat sink 12.

In another possibility, power supply 6 is connected to supply contacts of the first and second controllers 20, 20' such that a positive battery terminal is provided on each respective controller by supply contacts 26b and 26b', and a negative battery terminal is provided on each respective controller by supply contacts that are aligned when the controllers are arranged back to back. With reference to FIGS. 2A and 2B, that is to say, supply contact 24c' provides the negative battery terminal on the second controller 20' when supply contact 24a provides the negative battery terminal on the first controller 20, and supply contact 24a' on the second controller 20' provides the negative battery terminal when supply contact 24c provides the negative terminal on the first controller 20. This allows the controllers 20, 20' to be connected in parallel to the power supply 6. In some examples, the front face carries 26b (the B+ terminal) and the rear face carries 26c (B− terminal) in these cases 26a is not a terminal, rather it is a hole which can carry a current sensor. Where a current sensor is disposed in this position it can be used to sense current passed through the hole to an adjacent controller.

As described above, the motor is a three-phase motor and the supply produced by controller 20 is three-phase AC. In another example, the motor may be a single-phase motor and the supply produced by the controller single-phase AC. In another example the motor may be a two-phase motor and the supply produced by the controller two-phase AC. The motor may simply be a multi-phase motor, configured to operate with a plurality of phases. As described above, the power source 6 comprises a battery. In other examples the power source may be a fuel cell or an electric double-layer capacitor (EDLC) or other source of DC power.

Although the inverter described employs IGBT other voltage controlled impedances may be used, such as MOS-FETs other types of IG-FET or BJTs.

DC Series Motor Control

Figure 7B:
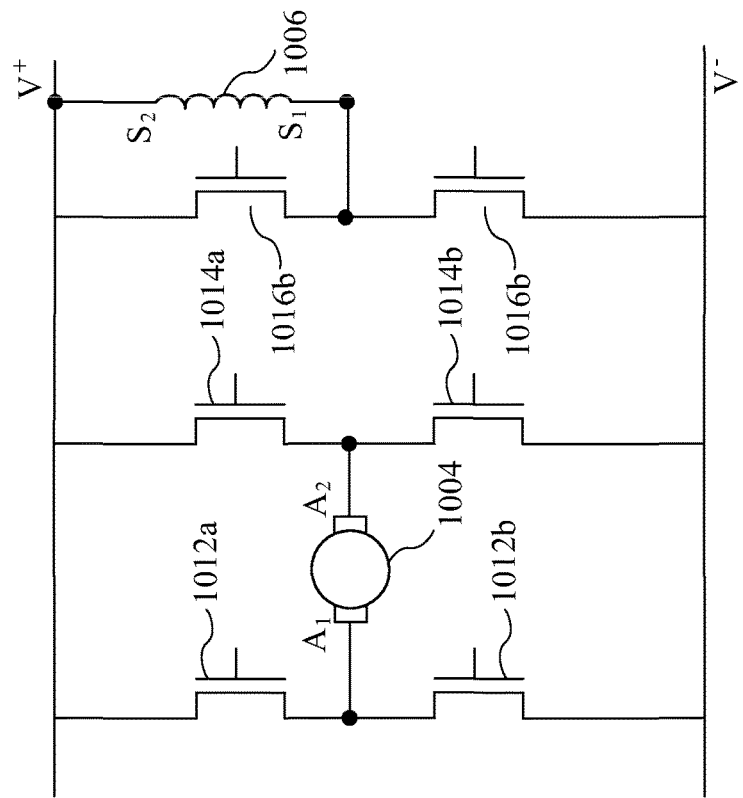
FIG. 7b schematically illustrates a further arrangement for power circuitry for a four terminal DC series motor.
Figure 7A:
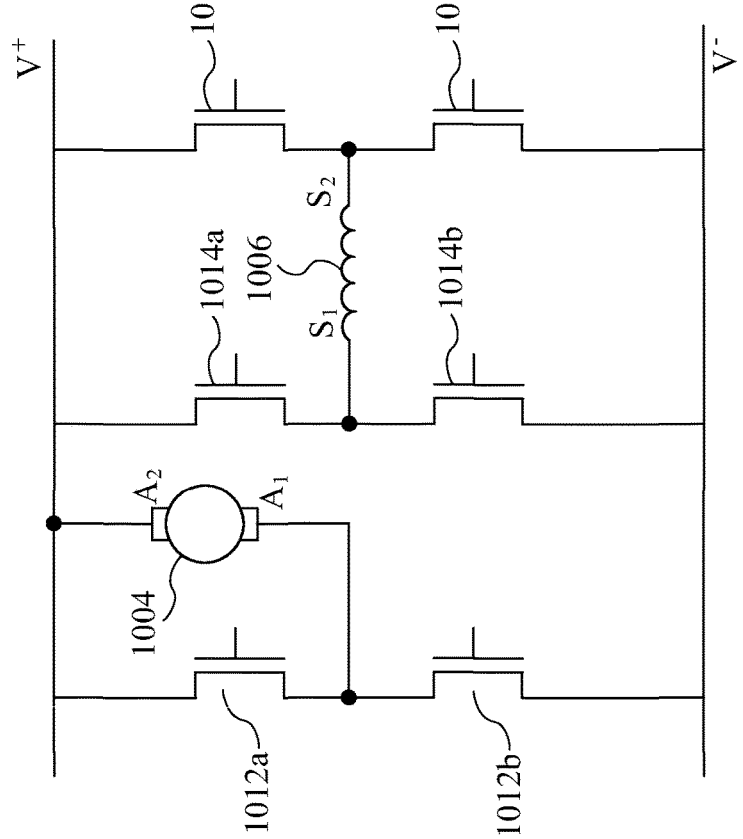
FIG. 7a schematically illustrates an arrangement for power circuitry for a four terminal DC series motor.

Embodiments of the DC Series Motor Control invention aim to allow a commercially available DC series motor to be operated in a similar fashion to a separately excited motor, providing a greater level of control of the motor operating characteristics while maintaining the ability to provide a high starting torque associated with DC series motors. FIGS. 7a and 7b illustrate two arrangements for connecting a four terminal DC series motor to a three phase inverter. Three phase inverter circuits are known and recently inverters capable of managing high currents have become commercially available at reasonable cost, such as the Sevcon® Gen4™ AC motor controller. Each leg of the inverter provides the same current capacity allowing equal currents to be provided to the armature and field windings. In the arrangement of FIG. 7a, a first leg of the three phase inverter comprises transistors 1012a and 1012b coupled in series between positive (V+) and negative (V−) supply voltages. The armature 1004 of the DC series motor is connected between the positive supply voltage and a first node between transistors 1012a and 1012b. Second and third legs of the three phase inverter comprise transistors 1014a and 1014b, and 1016a and 1016b respectively, coupled in series between the positive and negative supply voltages. Field winding 1006 is coupled between a second node between transistors 1014a and 1014b, and a third node between transistors 1016a and 1016b. While the armature 1004 is shown coupled to the positive supply voltage, it will be recognized that it could equally be coupled to the negative supply line.

In operation, a control signal comprising a series of control pulses is applied to the gate couplings of transistors 1012a and 1012b to modulate the current flowing through the armature winding 1004. It will be recognized that for each leg of the three phase inverter, the two transistors (a and b) will be controlled in complementary fashion so that only one of the transistors will conduct at one time. Thus, pulse width modulating the control voltage applied to transistors 1012a and 1012b allows the armature current $I_a$ to be controlled. As the field winding 1006 is coupled between two legs of the three phase converter, it is possible to reverse the direction of current $I_f$ through the field winding 1006, to thereby control the direction of rotation of the motor, by controlling the transistors 1014a, 1014b, 1016a, 1016b. Similarly, the magnitude of the field current $I_f$ can be controlled by modulating the control voltage of the transistors 1014a, 1014b, 1016a, 1016b, for example by using pulse width modulation.

In the arrangement of FIG. 7b the armature 1004 is coupled between the first node and the second node, while the field winding 1006 is coupled between the third node and the positive supply. As for FIG. 7a, the field winding could instead be coupled between the third node and the negative supply.

In operation of the circuit shown in FIG. 7b, the current $I_a$ in the armature 1004 is reversed, by switching of appropriate ones of the transistors of the three phase inverter, in order to reverse the direction of rotation of the motor.

As will be recognized, a three phase inverter circuit such as illustrated in FIGS. 7a and 7b will include further features that have been omitted to increase clarity of the figures. In particular, a freewheeling diode would be expected to be associated with each of the switches 1012a, 1012b, 1014a, 1014b, 1016a, 1016b.

In some circumstances, the arrangement of FIG. 7b may have advantages over that shown in FIG. 7a. In particular, the field winding generally has a much higher associated inductance than the armature, and therefore it is generally quicker to reverse the armature current when attempting to reverse the direction of rotation of the motor. Furthermore, the arrangement of FIG. 7b ensures that it is always possible to control the armature current $I_a$ even if the back e.m.f. becomes negative, e.g. during freewheeling of the motor. In contrast, in the arrangement of FIG. 7a, a negative e.m.f. may result in a short circuit forming across the armature via a freewheeling diode associated with the transistor 1012a, resulting in the armature current becoming uncontrolled.

Figure 8:
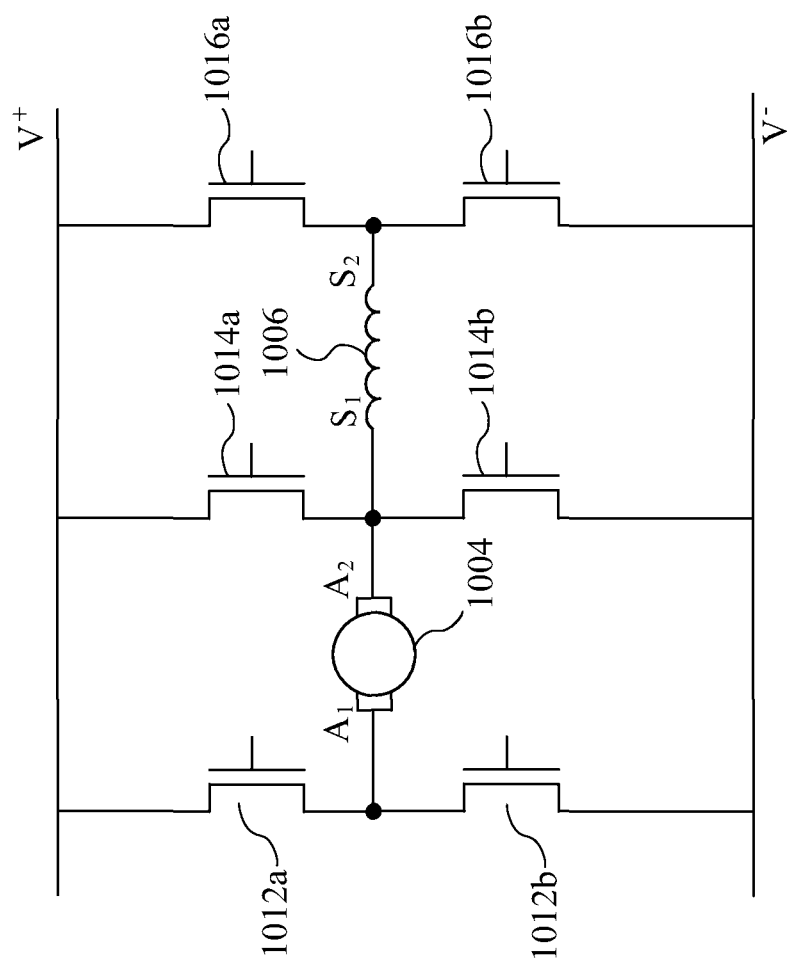
FIG. 8 schematically illustrates an arrangement for power circuitry for a three terminal DC series motor.

FIG. 8 illustrates an arrangement in which the three phase inverter is used to control a DC series motor provided with only three terminals. In the arrangement of FIG. 8 the armature 1004 is coupled between the first node and the second node of the three phase inverter, and the field winding 1006 is coupled between the second and third nodes.

Figure 9:
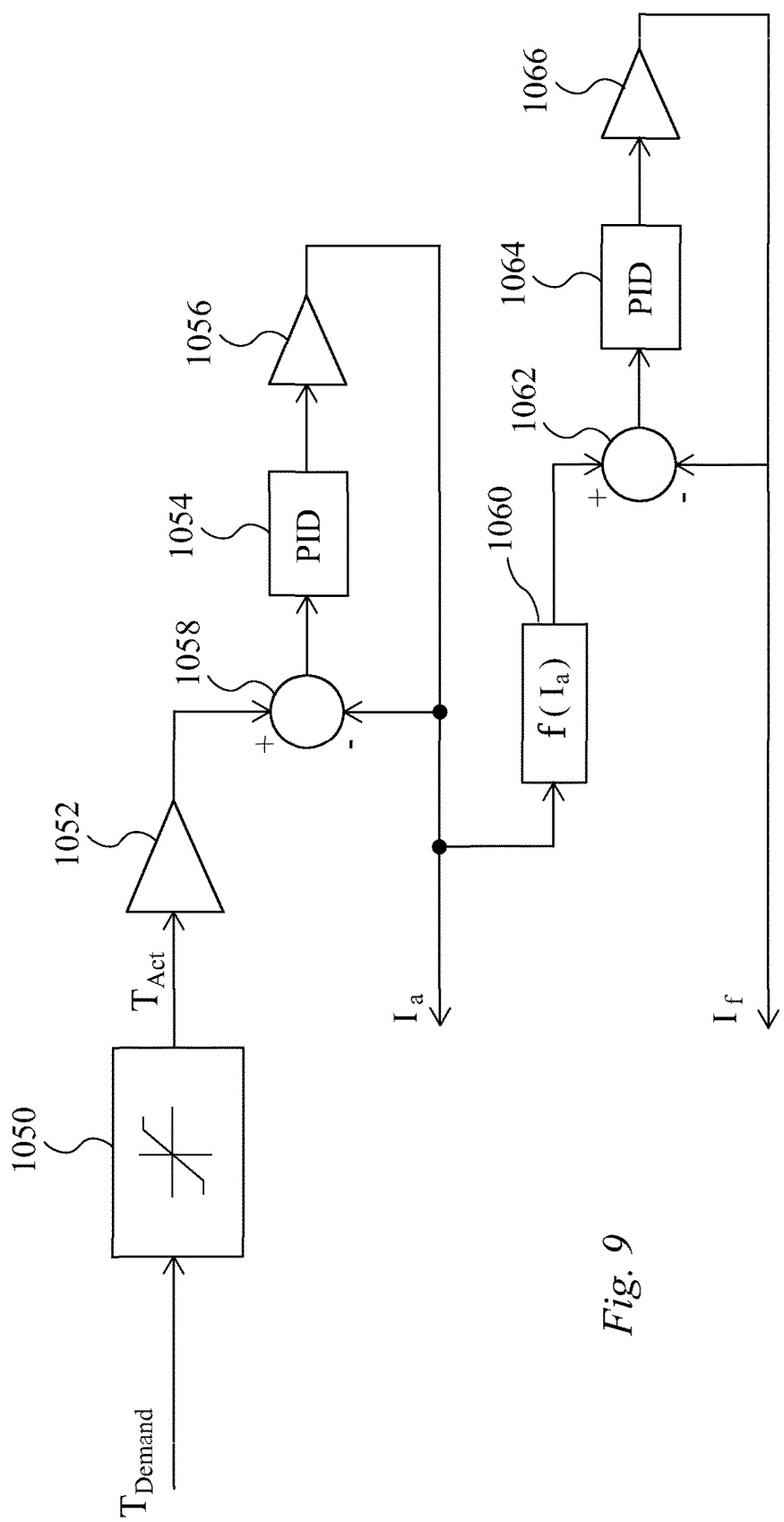
FIG. 9 illustrates a control algorithm for generating armature and field currents according to embodiments of the invention.

FIG. 9 illustrates a control algorithm for providing the armature current $I_a$ and the field current $I_f$ based on a torque demand ($\tau_{Demand}$). The algorithm of FIG. 9 can be used in conjunction with any of the arrangements shown in FIG. 7a, 7b or 8. It will of course be appreciated that the switches will be controlled differently in the different examples. For example, in the case of FIG. 7a switches 1012a and 1012b will be controlled to control the armature current whereas in FIG. 7b switches 1012a, 1012b, 1014a and 1014b will be controlled to control the armature current.

The following description with reference to FIG. 9 relates to the circuit shown in FIG. 7a.

According to the illustrated algorithm, a torque demand is received at a first function element 1050 which limits the torque demand, e.g. so that the torque demand does not exceed a maximum forward or maximum reverse torque. The limits may be predetermined or calculated based on measurements of the motor, for example temperature to protect the motor from excessive heat, or based on other criteria. The output of the function element 1050 is a torque demand ($\tau_{lim}$) that is to be provided by the motor.

The torque demand output ($\tau_{lim}$) is provided to a first amplifier 1052 which converts the torque demand to signal representing an armature current demand corresponding to the current required to provide the requested torque output. The current demand signal is then input to a feedback control loop consisting of a first differencer 1058, first PID controller 1054 and second amplifier 1056. The output of the feedback loop (from the second amplifier 1056) is configured to regulate the armature current by switching transistors 1012a, 1012b (this is true of the example shown in FIG. 7a but for other arrangements the precise switches controlled may be different, for example, in FIG. 7b it would be 1012a, 1012b, 1014a, 1014b for armature control) to provide the armature current $I_a$ for the motor based on the current demand signal from the first amplifier 1052.

The armature current $I_a$ is also supplied to a second function element 1060. Second function element 1060 includes a torque-flux table, this is just one option and other methods are known in the art. The torque-flux table is used by the second function element as a look-up table to convert the supplied armature current value to a field current demand value. The torque-flux table may be generated empirically, by characterisation of the motor or may be based on calculated performance of the motor. The output field current demand value is then input to a further feedback loop comprising second differencer 1062, second PID controller 1064, and third amplifier 1066 which regulates the output field current $I_f$ based on the field current demand value. The output of this feedback loop (from the third amplifier 1066) is configured to regulate the field current by switching transistors 1016a, 1016b to provide the field current $I_f$ for the motor based on the current demand signal from the third amplifier 1066.

It will be appreciated that the use of a torque-flux table is just one way of deriving $I_f$ and that other ways known in the art may be used to derive $I_f$ from $I_a$ and other parameters.

By calculating the field current $I_f$ based on the armature current $I_a$ the control algorithm of FIG. 9 provides automatic field weakening. This is because as the back e.m.f. (electromotive force) of the motor increases eventually the available supply voltage will not be able to provide the desired armature current to the motor. However, as the field current $I_f$ is calculated based on the armature current $I_a$, the reduction in armature current will automatically lead to a proportional reduction in the calculated field current.

As will be understood by the skilled reader in the context of the present disclosure, FIG. 9 is merely schematic and when implemented in apparatus, one or more functions illustrated as separate functional components may be provided by a single control element or may be further subdivided into multiple elements. In addition, the field current and the armature current for the motor may be regulated using pulse width modulated, PWM, control signals applied to the transistors. The signals passed between elements of the algorithm in FIG. 9 may be single values, or multi-valued parameters describing PWM signals or in some examples may comprise PWM signals.

Figure 5:
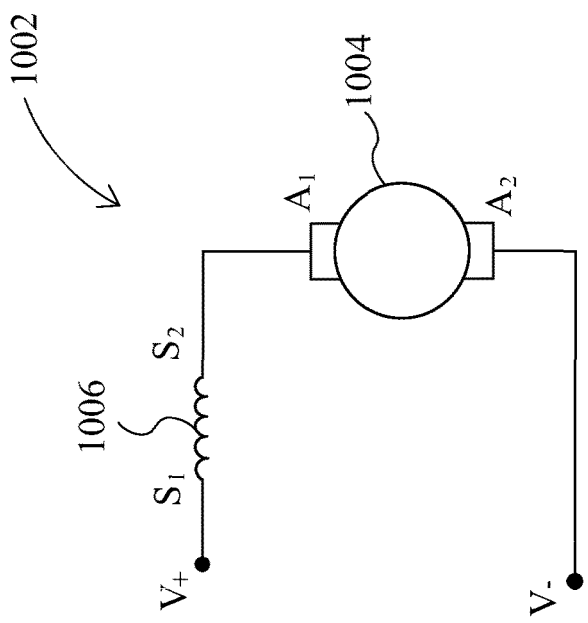
FIG. 5 schematically illustrates a DC series motor.
Figure 10:
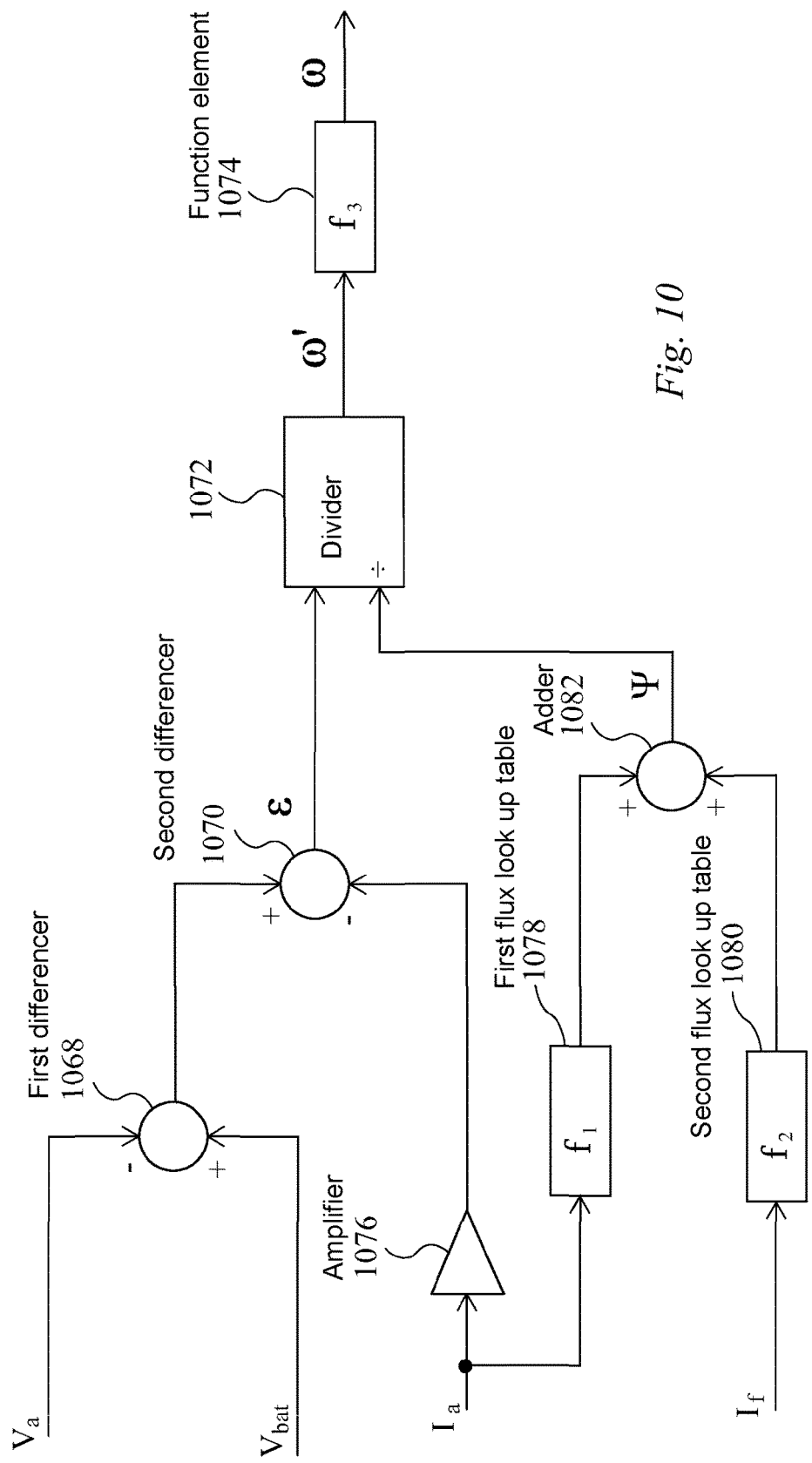
FIG. 10 illustrates a method of determining motor speed according to an embodiment of the invention.

FIG. 10 illustrates a speed calculation algorithm for a DC series motor being controlled according to the algorithm of FIG. 5. For many applications, it is helpful to be able to accurately determine the rotational speed of the motor, however measuring the speed of the motor directly can be difficult. The algorithm of FIG. 10 provides a way of calculating the speed based on easily measured, or known, values such as the armature and field currents applied to the motor and the armature voltage $V_a$ and battery/supply voltage $V_{bat}$.

The speed control algorithm operates by determining a back e.m.f (electro-motive force) for the motor and dividing this by an estimate of the magnetic flux within the motor due to the field and armature windings. For a motor having independently controlled field and armature currents, the determination of the magnetic flux must take into account both of these values, providing an extra complication.

In order to calculate the back e.m.f. the armature voltage is subtracted from the battery voltage at a first differencer 1068. The output of first differencer 1068 is then supplied to a second differencer 1070. The armature current is supplied to amplifier 1076, which multiplies the armature current with the resistance of the armature to determine the IR losses in the armature (i.e. the voltage dropped across the armature due to the armature resistance). This value is then input to the second differencer 1070 where it is subtracted from the output of the first differencer 68 to determine the back e.m.f value.

The armature current value $I_a$ is also input to a first flux look up table 1078 which outputs a first flux value associated with the armature current $I_a$. The field current $I_f$ is input to a second flux look up table 1080 which outputs a second flux value associated with the field current. The first and second flux values are then input to adder 1082 to calculate the total magnetic flux ψ within the motor. The calculated back e.m.f. value and the total flux are then input to divider 1072 where the back e.m.f. value is divided by the total flux to generate a speed value which is then scaled in a function element 1074 to provide a calibrated speed value for the motor.

Thus, the algorithm of FIG. 10 is able to calculate an accurate speed value based on easily measured electrical parameters of the electrical supply to the motor. Although the inverter has been described with reference to IGBT transistors this is merely exemplary and any voltage controlled impedance may be used, for example MOSFETs, IG-FETs or BJTs.

Figure 11:
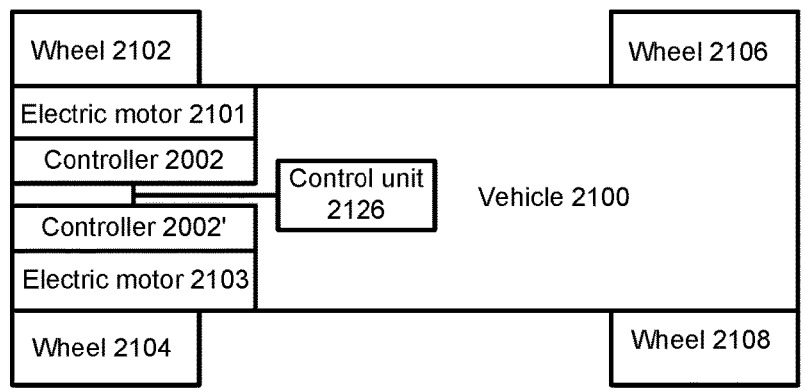
FIG. 11 shows a very schematic view of an electric vehicle.

FIG. 11 shows a vehicle 2100 having four wheels 2102, 2104, 2106, 2108. Wheels 2106 and 2108 are opposite each other towards the front of the vehicle. Wheels 2102 and 2104 are opposite each other towards the rear of the vehicle 2100.

Wheel 2102 is coupled to electric motor 2101, which in turn is electrically coupled to motor controller 2002. Wheel 2104 is coupled to electric motor 2103 which in turn is electrically coupled to motor controller 2002'. Vehicle control unit 2126 is coupled to both of the motor controllers 2002, 2002'.

The electric motors 2101, 2103 are operable to drive the wheels 2101, 2103 independently of one another under the control of controllers 2002, 2002'. The vehicle control unit 2126 provides control signals to controllers 2002, 2002' to control movement of the vehicle by driving the motors 2101, 2103.

Although shown as rear wheel drive the vehicle 2100 may be front wheel drive. In addition, although the vehicle 2100 is shown as a two wheel drive vehicle examples of the invention may be applied to four wheel drive vehicles. The vehicle control unit 2126 may be coupled to the controllers 2002, 2002' by a control bus such as a controller area network, CAN-bus.

Figure 12:
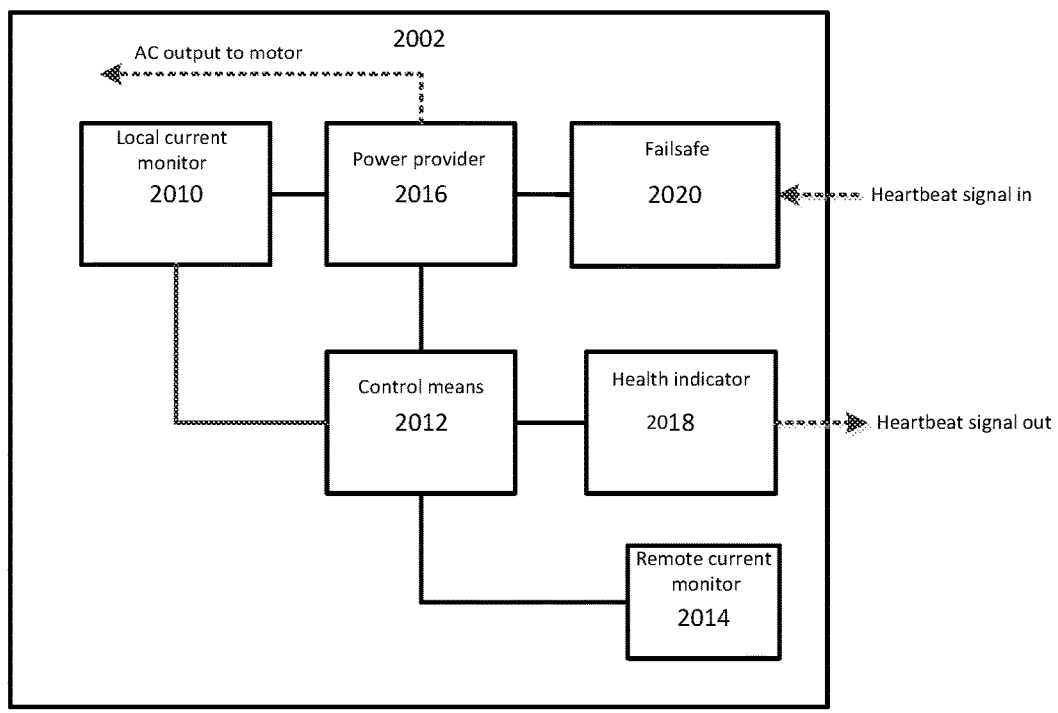
FIG. 12 shows a motor controller.

FIG. 12 shows a motor controller 2002 comprising a control means 2012 coupled to a local current monitor 2010 and a remote current monitor 2014. The motor controller comprises a power provider 2016 which is coupled to an external fail safe 2020 and to the control means 2012. The control means 2012 is also coupled to a health indicator 2018.

In FIG. 12 power supply input connections (e.g. battery connections) and AC power output connections are not shown. Power supply connections are discussed in more detail below with reference to FIG. 14.

The power provider 2016 includes an insulated gate bipolar transistor, IGBT, inverter and is operable to provide a pulse width modulated power output to an electric motor based on a direct current, DC, power supply. The power provider can be disabled by a shutdown signal from the control means 2012 or as a result of the failsafe 2020 disconnecting the power electronics (e.g. the PWM drive) of the power provider 2016. When the output of the failsafe 2020 is in the enabling state, it turns on a transistor circuit (not shown) which controls the supply of power to the PWM drive circuits of the power provider 2016. When the output of the failsafe 2020 is in the disabling state, it turns off the transistor circuit thereby deactivating the PWM drive.

The local current monitor 2010 is operable to sense current drawn from the DC power supply by the power provider 2016 and provides a sense output signal to the control means 2012 based on the sensed current flow. This local current monitor 2010 is operable to provide an estimate of output torque from a motor driven by the power provider 2016 and can be used to check whether the controller is providing energy to the motor (e.g. operating in a drive mode) or if the motor is returning energy to the controller (as in a regenerative brake mode). The remote current monitor 2014 is operable to be coupled to sense current drawn by a power provider of another motor controller, similar to motor controller 2002.

The health indicator 2018 is operable to provide a heartbeat output signal at its output coupling dependent upon a determination that the other components of the motor controller, 2010, 2012, 2014, 2016, 2018, 2020 are functioning correctly and that the signal from the remote current monitor 2014 is consistent with safe operation of the vehicle. The heartbeat signal is a sequence of square-wave pulses having a selected amplitude, frequency and duty-cycle. If the heartbeat signal is acceptable then the failsafe 2020 produces a signal which enables the power provider. If the heartbeat signal is not acceptable then the output of the failsafe circuit disables the power provider 2016.

It will be understood that the output of the failsafe is combined with other signals in the system, for example the inverse of the shutdown signal from the control means 2012, so that all such signals must be in the enabling state to enable the power provider 2016 and so that any such signal in the disabling state will cause the power provider to be disabled. A means to prevent the power provider 2016 from re-enabling for a period of time after it has been disabled is provided. Determination of correct function is based on checking the range and in some cases transient behaviour of signals associated with the various component blocks.

In the example of FIG. 12 the heartbeat signal comprises a pulsed (square wave) signal.

The failsafe 2020 is operable to receive a heartbeat signal from an external system and to provide an enable signal to the power provider 2016. The failsafe 2020 is configured to provide an enable signal to the power provider 2016 in the event that it receives a heartbeat signal and the power provider is arranged such that it cannot be activated in the absence of an enable signal from the failsafe, for example the power supply to the power provider may be configured such that, in the absence of an enable signal the power supply to the power provider 2016 is disconnected. In addition to or as an alternative to a failsafe, the failsafe 2020 may also comprise a detecting means configured such that in the event that it does not receive a heartbeat signal it causes the power provider to taper or reduce or to otherwise modify its power output to a safe level. In some cases the power provider or the failsafe may include a timer configured to prevent the power provider from being re-enabled for a selected time after it has been disabled. Alternatively or in addition, the failsafe or the power provider may be arranged to signal to the control means 2012 that action has been taken to disable the power provider.

The control means 2012 is a control device, such as a microprocessor, configured to control operation of the other components of the controller 2002. For example, the control means 2012 is configured to compare the local current sensed by the local current monitor 2010 with the current sensed by the remote current monitor 2014. Based on this comparison the control means 2012 is configured to control the power provider 2016. For example, in the event that the direction of the current sensed by the local current monitor 2010 does not match the direction of the current sensed by the remote current monitor 2014 the control means is configured to shut down the power provider. This could relate to a situation in which one of the motors is engaged in regenerative braking. Note that the reversal of battery current in the reversed motor will be transient. If the situation persists then regenerative braking will end. The reversed motor could start to drive in the opposite direction and battery current would then go back to the original sense.

In operation the power provider 2016 provides an AC power output signal for an electric traction motor provided that: (a) the failsafe 2020 provides an enable signal to the power provider 2016 indicating that the failsafe 2020 is receiving a valid heartbeat signal; and (b) the control means does not provide a shut down signal to the power provider. The health indicator 2018 provides an output heartbeat signal (e.g. to be received by another controller) in the event that it determines that the other components 2010, 2012, 2014, 2016, 2018, 2020 of the motor controller are functioning correctly and that the signal from the remote current monitor 2014 is consistent with safe operation of the vehicle, e.g. to ensure that the motors are driving in the same direction (or that they are driving in a selected direction or to ensure that the speed or torque of the motor is within a selected range, for example a range based on the speed or torque of another motor and/or the current supplied thereto. In some cases the power provider is configured to check that the remote motor's direction of rotation is consistent with safe operation. For example, where the power provider is coupled to a controller area network bus (CANbus) of a vehicle then speed information from the remote monitor may be read from the CANbus to perform this check. Although the power provider 16 has been described as comprising an IGBT inverter other types of inverter may be used, for example the inverter may comprise IG-FETs, MOS-FETs, BJTs or other types of voltage controlled impedances. Coupling between components of the system may be direct or indirect and, where appropriate, may be provided by wireless couplings and/or through other components of the system. Although, for the purposes of explaining the invention components of the system have been shown as discrete units, this is merely exemplary and similar functionality may be provided in a smaller number of functional units, a single integrated unit, or the functionality may be further distributed/subdivided between a greater number of functional units.

The failsafe circuit could be implemented using digital or analogue electronics. The heartbeat signal is described as a sequence of square-wave pulses having a selected amplitude, frequency and duty-cycle. However other waveforms such as sinusoids or sawtooth waveforms may be used. In addition, one or more of the amplitude, frequency and duty cycle may not be used. For example the heartbeat may simply be based on the frequency of the signal or its amplitude or the duty cycle. In some cases a combination of two or more of these parameters may be used.

Figure 13:
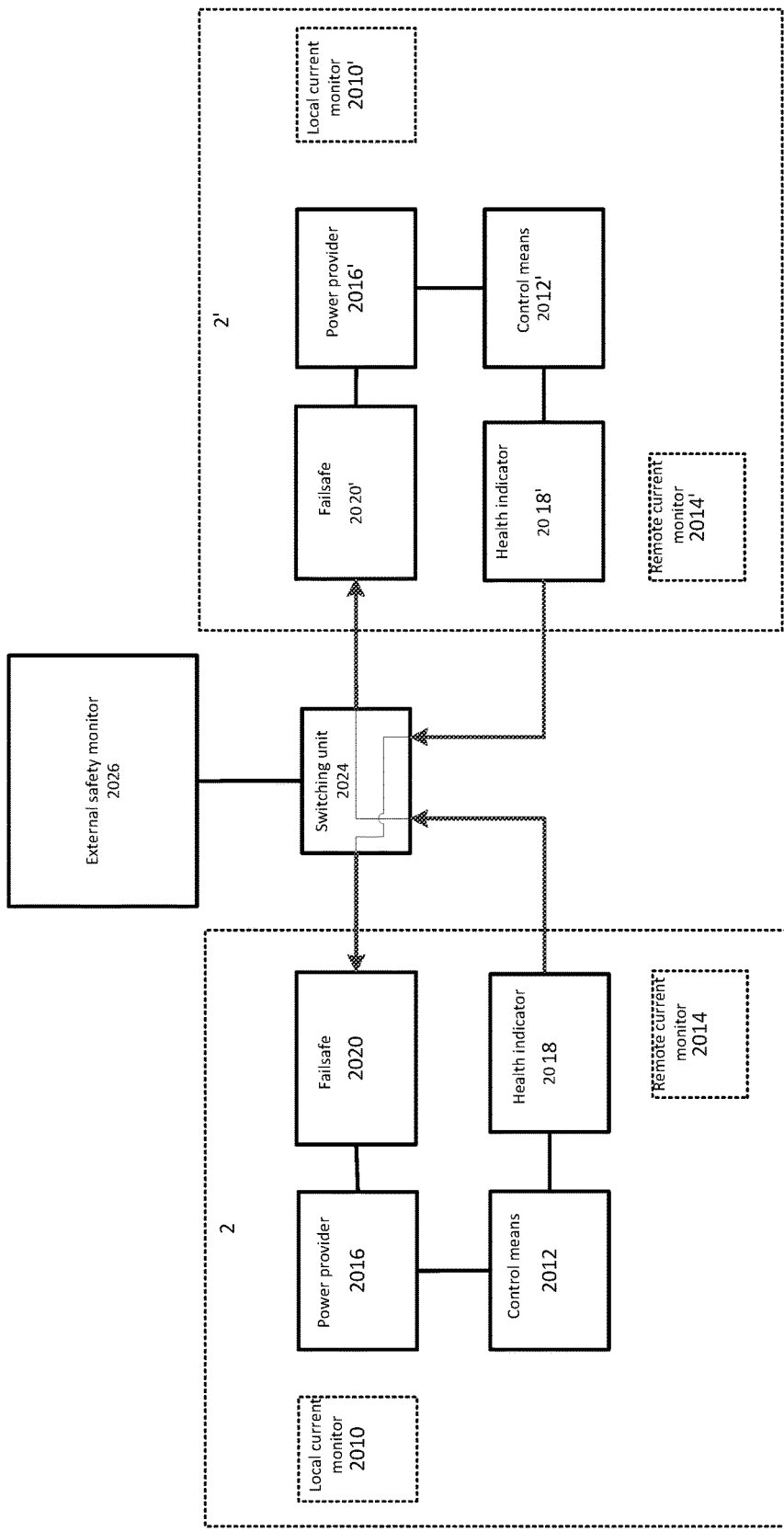
FIG. 13 shows a configuration of two motor controllers with an external control unit.

FIG. 13 shows the motor controller 2002 of FIG. 12 (in which like reference numerals indicate like elements) in use with a second similar motor controller 2002' and an external safety monitor 2026. To assist understanding of the example of FIG. 13, elements which are not directly relevant to the example are shown only in broken lines; these or other elements may be omitted. The external fail safe 2020 of the motor controller 2002 is coupled to the health indicator 2018' of the second motor controller 2002' by a switching unit 2024. The external fail safe 2020' of the second motor controller 2002' is coupled to the health indicator 2018 of the motor controller 2002' by the switching unit 2024. The switching unit 2024 is coupled to the external safety monitor 2026. The external safety monitor 2026 may be provided by a control unit such as the vehicle control unit 2126 of FIG. 11.

The switching unit 2024 is controllable by the external safety monitor 2026 to couple/decouple the failsafe 2020 of the motor controller 2002 to the health indicator 2018' of the second motor controller 2002'. The switching unit 2024 is also controllable by the external safety monitor 2026 to couple/decouple the failsafe 2020' of the second motor controller 2002' to the health indicator 2018 of the motor controller 2002.

In operation the external safety monitor 2026 and/or the health indicator 2018 monitors safety parameters of the vehicle such as; the current sense of each motor controller 2020, 2002'; the key switch voltage (e.g. the supply voltage to the control electronics, as opposed to the supply voltage of the main power stage); the temperature of the power transistors (IGBTs) of each controller; the temperature of the control logic of each controller; the voltage and/or temperature of DC link tracks; ADC calibration voltages; analogue inputs; supply voltage (Vcc) monitors (for monitoring programmable and fixed supply voltages); speed feedback measurements (such as sin-cos encoder data; resolver measurements); other digital inputs and motor PTC inputs. These are merely examples of parameters which can be monitored, some or all of them may not be used in practice and/or other additional safety parameters may be monitored. Fault detection may be performed by comparing one or more of these parameters with selected threshold values or selected ranges or by comparing sampled values of a parameter over a time interval to measure its transient behaviour, for example the rate of change of one or more of these parameters may be compared with a selected threshold level or a selected range; the thresholds and ranges may be selected based on stored (e.g. predetermined) values or may be determined on the fly based on other parameters.

The external safety monitor 2026 is operable to detect a fault condition based on monitoring of one or more of these safety parameters and to control the switching unit 2024 in response. For example, in the event that the external safety monitor detects a fault it can control the switching unit 2024 to decouple the failsafe 2020' of the second motor controller 2002' from the health indicator 2018 of the motor controller 2002 and/or to decouple the failsafe 2020 of the first motor controller 2002 from the health indicator 2018' of the second motor controller 2002'. In response to disconnection of the health indicator 2018, 2018' from the failsafe 2020, 2020' the controllers will shut down. For the configuration where 2018' is connected to 2020 and 2018 is connected to 2020' then both controllers will be shut down as a result of failure of one controller.

Figure 14:
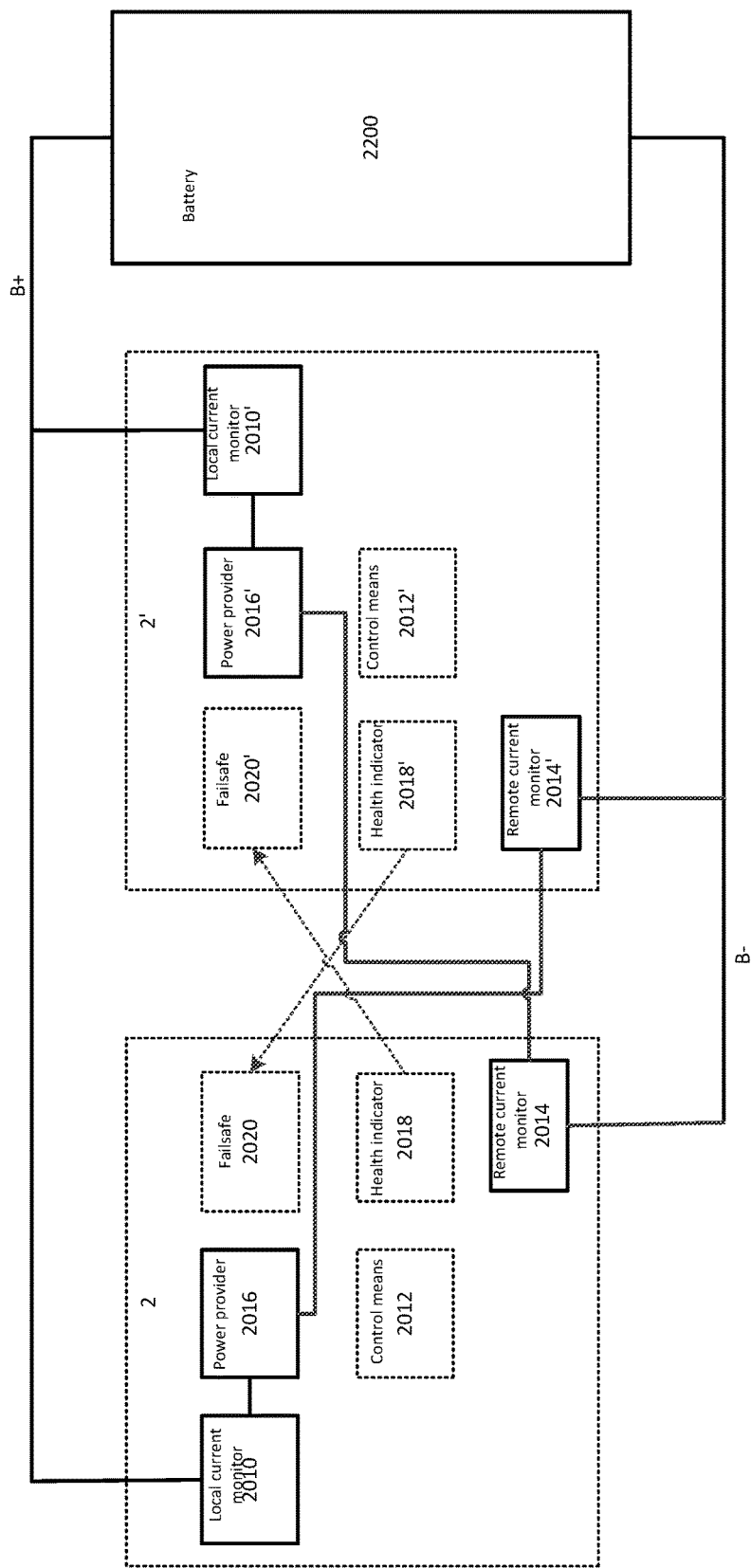
FIG. 14 shows two interconnected motor controllers.

FIG. 14 shows another example of the motor controller 2002 of FIG. 12 (in which like reference numerals indicate like elements) in use with a second similar motor controller 2002'. To assist understanding of the example of FIG. 14, elements which are not directly relevant to the example are shown only in broken lines and connections which are not directly relevant have been omitted.

The local current monitor 2010 of motor controller 2002 is electrically coupled in series between the positive battery terminal B+ of a battery 2200 and the power provider 16 of motor controller 2002. The remote current sense module of the second motor controller 2002' is electrically coupled in series between the power provider 2016 of the first motor controller 2002 and the negative battery terminal B− of the battery 2200. The local current monitor 2010' of motor controller 2002' is electrically coupled in series between the positive battery terminal B+ of a battery 2200 and the power provider 16' of motor controller 2002'. The remote current sense module of the first motor controller 2002 is electrically coupled in series between the power provider 2016' of the motor controller 2002' and the negative battery terminal B− of the battery 2200. In this way the remote current monitor 2014 of controller 2002 is coupled to monitor the sense of the current drawn by the power provider 2016' of motor controller 2002' and the remote current monitor 2014' of controller 2002' is coupled to monitor the sense of the current drawn by the power provider 2016 of motor controller 2002. Thus, each controller 2002, 2002' is arranged to monitor the sense of the current drawn or generated by the other motor controller.

In some examples according to FIG. 14, to provide a paired controller interlock the failsafe 2020 of the motor controller 2002 is coupled to the health indicator 2018' of the second motor controller 2002'. The external fail safe 2020' of the second motor controller 2002' is coupled to the health indicator 2018 of the motor controller 2002'.

Although they are shown as being connected as series current measurement devices the current monitor 2010, 2010', 2014, 2014' may be provided by inductive or Hall Effect current transducers which need not be conductively coupled to the power supply lines and/or maybe provided by other current sensing devices such as current sensing transistors. In some examples the current monitors may also be configured to monitor current magnitude as well as or instead of current direction.

Figure 15:
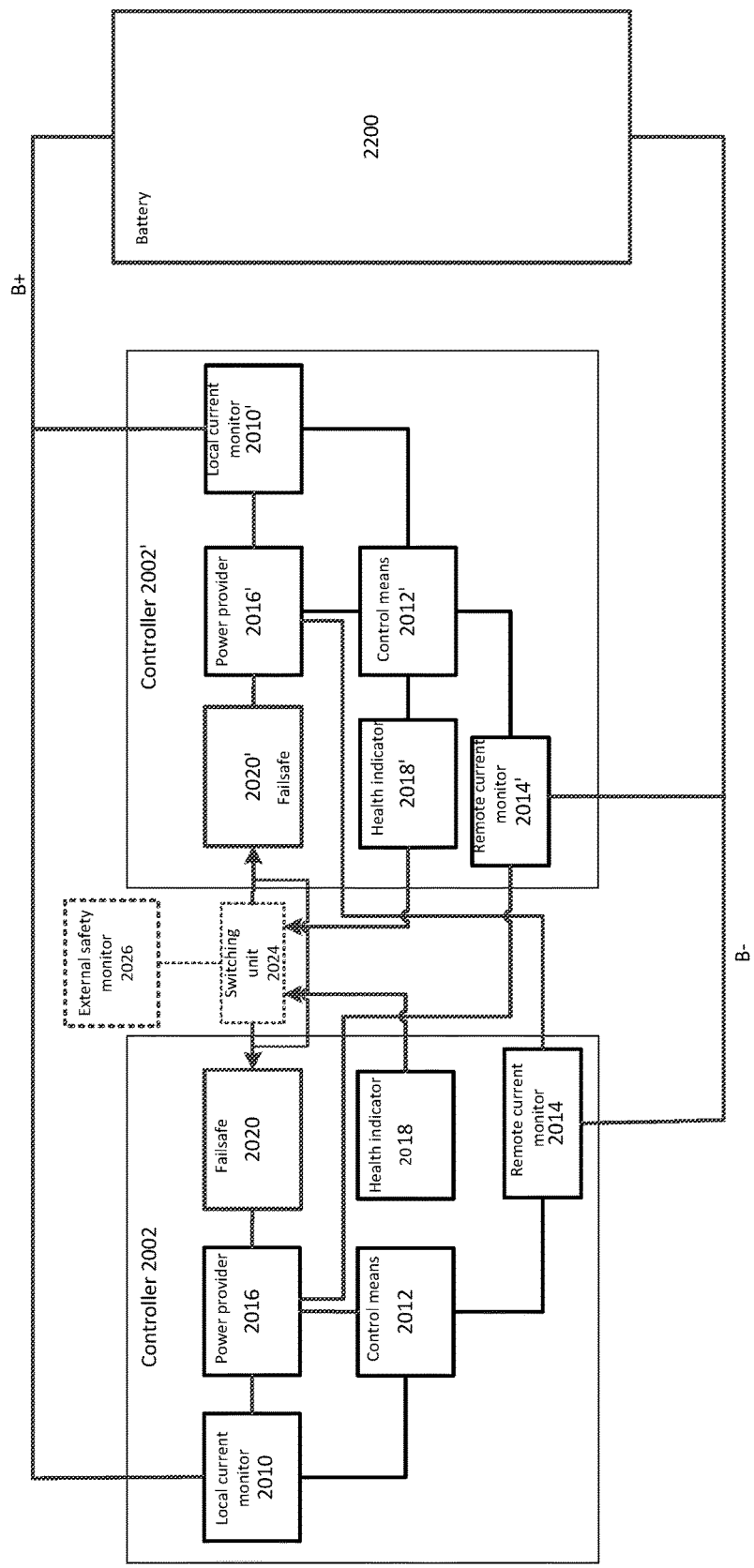
FIG. 15 shows an example combining features of FIGS. 13 and 14.

FIG. 15 uses the same reference numerals as FIG. 13 and FIG. 14 to indicate like elements and shows an example which uses components of FIG. 13 and FIG. 14 in combination. In FIG. 15 the switching unit 2024 and the external safety monitor 2026 are shown in broken lines to indicate that the failsafe 2020 of the controller 2002 may be coupled to the health indicator 2018' of controller 2002' without the presence of a switching unit; likewise, the failsafe 2020' of the controller 2002' may be coupled to the health indicator 2018 of controller 2002 without the presence of a switching unit. In some cases the failsafe input on controller 2002 and 2002' can be supplied directly by the external safety monitor 2026 with the health signal generated by controllers 2002 and 2002' being monitored by the external safety monitor 2026.

In particular, the current monitor 2014 may be coupled to a current sensor arranged to provide a monitoring coupling in an electric motor controller (such as that described with reference to FIGS. 1 to 4) comprising at least one power supply input coupling and a monitoring coupling adapted for monitoring an operational parameter of another controller, wherein the monitoring coupling and the power supply input coupling are disposed in positions selected so that, when two controllers are arranged back-to-back the DC power supply (e.g. battery) terminal of one controller may be coupled to a DC power supply through the monitoring coupling of an adjacent controller. For example, if the controller is carried on a circuit board the monitoring coupling may be provided as a hole through the board with a current transducer arranged around/adjacent the hole. Thus the battery current to one board can be provided by a DC supply coupling that passes through the current transducer on an adjacent board, thereby providing the current monitor 2014 described herein.

Figure 16:
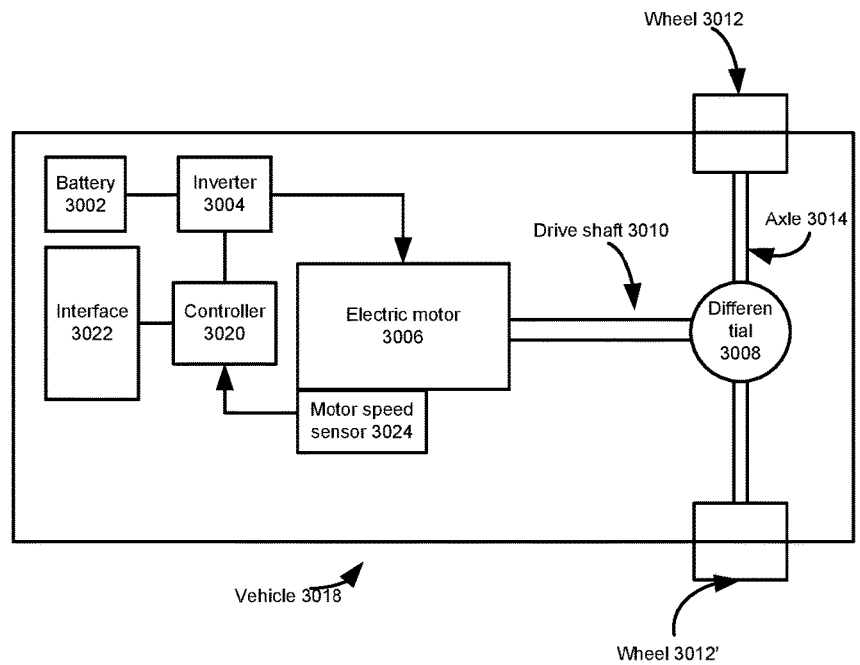
FIG. 16 shows a very schematic diagram of a vehicle.

FIG. 16 shows a vehicle 3018 having an electric motor 3006 coupled by a drive shaft 3010 to a differential 3008. The axle 3014 couples the differential 8 to the wheels 3012, 3012' so that the vehicle's drive line comprises the drive shaft 3010, differential 3008, axles 3014 and the wheels 3012, 3012'. Although only two wheels are shown in FIG. 16, this is merely illustrative and the vehicle may have more or fewer wheels.

The vehicle 3018 comprises a battery 3002 coupled by an inverter 3004 to the motor 3006. The motor controller 3004 is coupled to a controller 3020. Controller 3020 is coupled to sensor 3024 and to a driver control interface 3022.

In operation the inverter 3004 converts the DC supply from the battery 3002 to alternating current (AC) power supply for the motor 3006. The motor 3006 is operable, in response to power from the inverter to apply torque to the drive line 3008, 3010, 3014 to drive the wheels 3012, 3012'. The sensor 3024 is configured to sense the angular acceleration or torque output provided by the motor 3006 and is coupled to provide a signal to the controller 3020 indicating the sensed speed output of the motor 3006.

The driver user interface 3022 comprises an accelerator or torque demand input user interface for controlling the speed of the vehicle. The driver user interface 3022 is coupled to provide a torque demand signal to the controller 3020. The controller 3020 is configured to provide a control signal to the inverter 3004 to control the power supply to the motor based on the torque demand form the driver control interface 3022 and the motor's output sensed by the motor speed sensor 3024.

Figure 17:
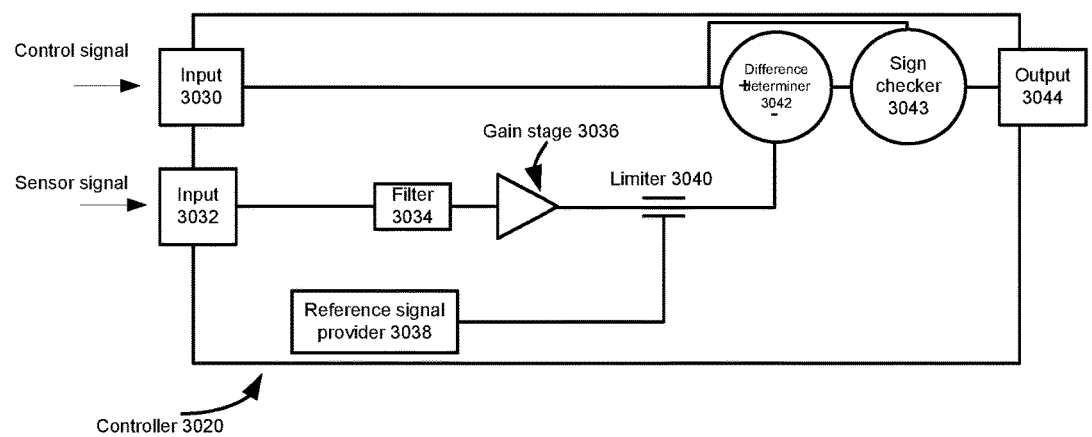
FIG. 17 shows a functional block diagram of a control system used in the vehicle of FIG. 16.

The controller 3020 will now be described in greater detail with reference to FIG. 17. Controller 3020 has a torque demand input 3030 for receiving a control signal from a driver user interface 3022 (in FIG. 16) and a sensor input 3032 for receiving a sensor signal from a motor speed sensor 3024 (also in FIG. 1). Torque demand input 3030 is coupled to a first input of a difference determiner 3042 and to a sign checker 3043. Sensor input 3032 is coupled by a filter 3034 to a gain stage 3036. The output of the gain stage 3036 is coupled to a second input of the difference determiner 3042. The output of the difference determiner 3042 is coupled to the sign checker 3043. The output of the sign checker 3043 is coupled to a control signal output 3044. A reference signal provider 3038 is coupled to a limiter 3040 applied to the output of gain stage 3036.

The controller 3020 receives a torque demand signal from the driver user interface 3022 at torque demand input 3030 and a measurement signal from the motor speed sensor 3024 at sensor input 3032. The rate of change of angular speed of the motor is used to determine a torque measurement signal $\partial\omega/\partial t$.

The filter 3034 filters the torque measurement signal received from the torque sensor to select or emphasise particular signal frequency components and to attenuate others. The inventors in the present case have appreciated that parts of an electric vehicle produce electrical noise signals having known or predictable frequency characteristics. For example, a vehicle may include a noise source at or around 50 Hz so in some examples filter 3034 includes a notch filter adapted to attenuate signals in a frequency band around 50 Hz. In some possibilities a low pass filter with a 50 Hz cut off may be used, this has the advantage of smoothing out sampling noise. In addition, the inventors have realised that the vehicle drive line and the vehicle itself provide an oscillatory system having certain characteristic (e.g. resonant) frequencies. In the example of FIG. 16 the transfer function/pass-band of the filter 3034 is selected based on the characteristic frequency of the vehicle and the vehicle drive line. This characteristic frequency depends upon the torsional stiffness of the components of the drive line, the resilience of the tires, the stiffness of the vehicle suspension, the mass of the vehicle and the moment's of inertia of the rotating components in the vehicle drive line amongst other factors. The filter 3034 may be provided by an analogue filter having an LCR network having band-pass and/or notch features or by digital electronics.

The reference signal provider 3038 provides a reference signal to the limiter 3040. Limiter 3040 is operable to limit the signal provided to the difference determiner such that it does not exceed (e.g. is limited by) the reference signal. In the example of FIG. 16 the reference signal is selected to be 10% of the maximum possible torque demand value. This has the advantage that motor speed oscillations can be damped without intentional changes in torque demand being damped to such an extent that the system does not respond sufficiently quickly to user controls. The inventors in the present case have found that 10% is a "safe" value for the application. Experiments showed that only small corrections to torque output were required to mitigate the oscillations. As the algorithm is trying to resist changes in speed, removing the 10% limit could result in the vehicle becoming unresponsive. In practice, the gain would be set such that the limit is rarely used—only small corrections would be necessary. Having the limit in place gives confidence that oscillation damping will never be able to completely override the driver's demand. It may be useful to allow different values to be configured.

The sign checker 3043 compares the sign of the torque demand signal provided at the torque demand input 3030 with the modified torque demand to be provided to the torque demand output 3044 and, in the event that the torque demand input is of opposite sign to the modified torque demand the modified torque demand is set to zero. In this example the sign checker 3043 is implemented using a software algorithm based on the following pseudo-code:

```
if( torque_demand > 0 )
{
  torque_demand = torque_demand -
      correction_value;
  if( torque_demand < 0 )
  {
    torque_demand = 0;
  }
}
else if ( torque_demand < 0 )
{
  torque_demand = torque_demand -
      correction_value;
  if( torque_demand > 0 )
  {
    torque_demand = 0;
  }
}
```

In operation the controller 3020 receives a torque demand signal from the driver control interface 3022 (FIG. 16) and the sensor 3024 (FIG. 16) provides a sensed torque signal to the controller 3020 based on the torque provided by the electric motor 3006 (FIG. 16). The filter 3034 selects components of the sensed torque signal which may be characteristic of unwanted motor speed oscillations and attenuates noise components according to the transfer function of the filter. The output signal from the filter 3034 is provided to the gain stage 3036. The gain stage 3036 applies a scaling to the filter output to provide a subtraction signal to be subtracted from the torque demand input—e.g. it sets the gain of the feedback loop. Typically the scaling applied by the gain stage is tuned by driving the vehicle and trying different gains to see what effect they have on the drivetrain. Oscillations normally manifest as an audible warble from the motor or drivetrain. The scaling value would be set as low as possible where the oscillations are not noticeable. Using a low value minimises the algorithms ability to counter the demanded torque which would reduce the response of the vehicle. The subtraction signal output from the gain stage 3036 is provided to limiter 3040. In the event that the magnitude of the output of the gain stage exceeds the reference signal then the limiter clips the output of the gain stage so that it's magnitude does not exceed (e.g. is limited by) the reference signal provided by the reference signal provider 3038. The difference determiner subtracts the scaled filtered torque measurement signal from the torque demand signal received from the driver control interface 3022 (FIG. 1). The output of the difference determiner provides a modified torque demand output to be used as the input for a controller controlling the motor 3006.

In the example of FIG. 16 the wheels 3012, 3012', the axle 3014, the differential and the drive shaft make up the drive line. Of course this is merely an example of a drive line and, in practice a drive line may comprise additional components or some of the components shown in FIG. 16 may be omitted for example in direct drive systems or in systems which do not include a differential. In some examples a 3004 wheel drive system maybe used. In the example of FIG. 16 the sensor 3024 is shown disposed adjacent the motor however in practice the sensor may also be disposed on the drive shaft or some other aspect of the drive line and/or it may be an electronic sensor which determines the torque output based on the current drawn by the motor 3006. FIG. 16 shows a single motor driving two wheels through a differential, however other topologies may be used, for example each wheel may be driven by a separate motor. In this case each motor would be controlled separately according to the algorithm outlined above.

The controller 3020 may be implemented by analogue electronics using passive and/or active analogue components. In some examples the controller 3020 may comprise or be provided by digital electronics such as DSP circuitry, application specific integrated circuits, FPGA or other digital electronics. The controller may also comprise or be implemented by a programmable processor configured using program instructions to implement features of the methods and/or apparatus described herein.

It is intended that one or more features of any of the examples described above and/or defined in the appended claims may be omitted and/or combined with one or more features of any of the other examples. The methods described herein may be implemented in hardware middleware or software or any combination thereof. In addition, examples of the invention comprise computer readable storage media and computer program products operable to program a processor to perform any of the methods described herein and in particular to configure a processor to perform one or more of the functions carried out by the control means 2012, the failsafe 2020, or the health indicator 2018 as described hereinabove.

The invention claimed is:

1. Torque control apparatus for an electric vehicle, the apparatus comprising:
   a controller coupled to receive a torque demand signal from a driver user interface and a sensor signal from a motor speed sensor, wherein the sensor signal is based on an angular speed of an electric motor and comprises an indication of a rate of change of angular speed of the motor;
   wherein the controller is configured to provide a modified torque demand signal by subtracting a subtraction signal from the torque demand signal, wherein the subtraction signal is based on the sensor signal and has a magnitude, and wherein the controller further comprises:

a limiter that limits the magnitude of the subtraction signal to not exceed a reference signal level; and a sign checker that compares the torque demand signal with the modified torque demand signal and outputs a substitute torque demand signal based on the comparison.

2. The torque control apparatus of claim 1 having a filter to filter the sensor signal, wherein the filter is configured to filter the sensed signal to emphasise frequency components associated with selected frequency components relative to other frequency components of the sensed signal.

3. The torque control apparatus of claim 2 in which the selected frequency components are associated with characteristic frequencies of the vehicle's drive line and filtering comprises attenuating frequency components not associated with the characteristic frequencies of the vehicle's drive line.

4. The torque control apparatus of claim 2 in which the filter comprises at least one of a notch filter and a low pass filter configured to attenuate at least one noise frequency component.

5. The torque control apparatus of claim 2 in which the filter comprises a transfer function, and the controller is operable to vary the transfer function of the filter.

6. The torque control apparatus of claim 1 in which the controller is operable to configure the reference signal level.

7. The torque control apparatus of claim 1 in which the reference signal level is based on a maximum torque demand signal for the electric motor.

8. The torque control apparatus of claim 2 in which the filter comprises a transfer function, and the controller is operable to vary the transfer function of the filter in response to one of a received command and an operational condition of the vehicle.

9. The torque control apparatus of claim 1 in which the comparison comprises comparing a sign of the received torque demand signal with a sign of the modified torque demand signal.

10. The torque control apparatus of claim 9 in which the substitute torque demand signal is selected from a list of predetermined torque demand signal values, in which the controller is arranged such that the list of predetermined torque demand signal values is configurable.

11. The torque control apparatus of claim 10 in which the controller is configured to select the substitute torque demand signal based on an operational condition of the vehicle, in which the operational condition comprises at least one of a speed of the vehicle and a motor speed.

12. A method comprising:

receiving a torque demand signal from a driver user interface, the torque demand signal to be applied to an electric motor controller for a vehicle electric motor;

receiving a sensed signal from a motor speed sensor, the sensed signal being based on the angular speed of said electric motor; and determining a modified torque demand signal based on the received torque demand signal and the sensed signal, wherein the modified torque demand signal is determined by subtracting a subtraction signal from the received torque demand signal, and wherein the subtraction signal is based on the sensor signal and has a magnitude;

limiting, using a limiter, the magnitude of the subtraction signal to not exceed a reference value;

comparing, using a sign checker, the torque demand signal with the modified torque demand signal; and outputting from the sign checker a substitute torque demand signal based on the comparison.

13. The method of claim 12 in which the sensed signal based on the angular speed of said electric motor comprises a signal indicating the rate of change of angular speed of the electric motor.

14. The method of claim 12 comprising providing a substitute torque demand signal based on a comparison of the modified torque demand signal and the received torque demand signal, in which the comparison comprises comparing a sign of the received torque demand signal with a sign of the modified torque demand signal.

15. The method of claim 12 comprising filtering the sensed signal in which filtering comprises filtering the sensed signal to emphasise frequency components associated with selected frequency components relative to other frequency components of the sensed signal, wherein the selected frequency components are associated with characteristic frequencies of a drive line of a vehicle.

16. A non-transitory computer readable storage medium comprising program instructions operable to program a programmable processor to perform the method of claim 12.

17. An apparatus configured to perform a method according to claim 12.

18. A vehicle comprising an electric motor and a torque control apparatus according to claim 1.

* * * * *